United States Patent
Gorman

(10) Patent No.: US 8,486,208 B2
(45) Date of Patent: Jul. 16, 2013

(54) COLD CRACK ADDITIVE ON PAVING ADVERTISING AND RELATED METHODS

(75) Inventor: Gregory Winfield Gorman, Golden, CO (US)

(73) Assignee: ParkMarx Advertising, LLC, Arvada, CO (US)

( * ) Notice: Subject to any disclaimer, the term of this patent is extended or adjusted under 35 U.S.C. 154(b) by 436 days.

(21) Appl. No.: 12/271,477

(22) Filed: Nov. 14, 2008

(65) Prior Publication Data

US 2009/0075040 A1 Mar. 19, 2009

Related U.S. Application Data

(63) Continuation-in-part of application No. 11/186,310, filed on Jul. 21, 2005, which is a continuation-in-part of application No. 10/633,943, filed on Aug. 4, 2003, now abandoned.

(60) Provisional application No. 60/988,676, filed on Nov. 16, 2007.

(51) Int. Cl.
| | |
|---|---|
| *E04F 13/07* | (2006.01) |
| *E04F 13/072* | (2006.01) |
| *B29C 65/50* | (2006.01) |
| *B32B 37/00* | (2006.01) |
| *B32B 38/10* | (2006.01) |
| *B32B 43/00* | (2006.01) |

(52) U.S. Cl.
USPC ............ 156/71; 156/247; 156/249; 156/277

(58) Field of Classification Search
USPC 156/71, 247, 249, 277; 404/12–15; 428/40.1, 428/41.7, 41.8, 42.1, 43, 192, 201; 40/594
See application file for complete search history.

(56) References Cited

U.S. PATENT DOCUMENTS

| | | | | |
|---|---|---|---|---|
| 3,230,842 | A | * | 1/1966 | Denton et al. ................. 156/71 |
| 4,415,395 | A | * | 11/1983 | Paque ........................... 156/384 |
| 5,246,757 | A | * | 9/1993 | Condon et al. .............. 428/40.9 |
| 5,795,637 | A | | 8/1998 | Wilson et al. |
| 5,830,937 | A | * | 11/1998 | Shalov et al. ................. 524/297 |
| 5,928,761 | A | | 7/1999 | Hedblom et al. |
| 5,941,655 | A | | 8/1999 | Jacobs et al. |
| 6,012,818 | A | | 1/2000 | Araki |
| 6,051,297 | A | | 4/2000 | Maier et al. |
| 6,127,020 | A | * | 10/2000 | Bacon et al. ................. 428/161 |

(Continued)

FOREIGN PATENT DOCUMENTS

WO WO0238870 5/2002

OTHER PUBLICATIONS

3M, "Pavement Surface Preparation and Application Procedures for 3M™ Stanmark™ Disabled Pavement Marking Symbols" Series SMS-917 DS and SMS-918 DS, Jul. 1997, pp. 1-6.

(Continued)

*Primary Examiner* — Sing P Chan
(74) *Attorney, Agent, or Firm* — McCormick, Paulding & Huber LLP

(57) ABSTRACT

A paving advertisement has an elongated flexible tape body with a base substrate layer. The base substrate layer has front and rear faces, the front face having at least one text message that conveys information. The base substrate layer is treated with a cold crack additive, thereby increasing strength and flexibility.

12 Claims, 19 Drawing Sheets

U.S. PATENT DOCUMENTS

| | | | |
|---|---|---|---|
| 6,156,442 | A | 12/2000 | Phillips |
| 6,180,228 | B1 * | 1/2001 | Mueller et al. ............... 428/354 |
| 6,288,842 | B1 | 9/2001 | Florczak et al. |
| 6,326,053 | B1 | 12/2001 | Stump et al. |
| 6,365,262 | B1 | 4/2002 | Hedblom |
| 6,376,045 | B1 | 4/2002 | Wong et al. |
| 6,416,911 | B1 | 7/2002 | Mehta et al. |
| 6,432,528 | B1 | 8/2002 | Faust et al. |
| 6,469,199 | B1 | 10/2002 | Hansen et al. |
| 6,479,132 | B2 | 11/2002 | Hedblom et al. |
| 6,482,288 | B1 | 11/2002 | Kreckel et al. |
| 6,491,781 | B1 | 12/2002 | Kreckel et al. |
| 6,514,655 | B2 | 2/2003 | Bastiaens et al. |
| 6,515,649 | B1 | 2/2003 | Albert et al. |
| 6,524,412 | B2 * | 2/2003 | Smith ............................. 156/71 |
| 6,531,230 | B1 | 3/2003 | Weber et al. |
| 6,537,649 | B1 | 3/2003 | Martin et al. |
| 6,576,074 | B1 | 6/2003 | Cabrera et al. |
| 6,589,636 | B2 * | 7/2003 | Emslander et al. ......... 428/195.1 |
| 6,863,100 | B2 * | 3/2005 | Neal et al. .................... 150/165 |
| 6,914,540 | B2 * | 7/2005 | Gongolas .................... 340/908.1 |
| 2002/0096248 | A1 | 7/2002 | Bastiaens et al. |
| 2003/0123930 | A1 | 7/2003 | Jacobs et al. |
| 2003/0147695 | A1 * | 8/2003 | Hong et al. .................... 404/75 |

OTHER PUBLICATIONS

"3M™ Stanmark™ Disabled Pavement Marking", www.3m.com/products/s_index/Symbol,_3M(TM)_Stanmark(TM)_Disabled_Pavement . . . , May 14, 2003, 1 page.

3M, "Application of Stanmark™ Pre-Cut Symbols and Legends", Information Folder 5.8, May 2002, pp. 1-10.

3M, "Cutting, Matching, Premasking and Prespacing of 3M™ Scotchlite™ Reflective Sheetings and Films", Information Folder 1.10, Apr. 1998, 9 pages.

"3M™ Wet Reflective Pavement Marking Tapes Keep Roadways Visible in the Rain", www.3m.com/us/safety/tcm/news/WetReflective012503.jhtml, Feb. 2003, pp. 1-2.

3M"Series 750 Wet Reflective Removable Tape", http://products3.3m.com/catalog/us/en001/safety/traffic_control/node_1Z1NDZ90GJbe/root_GST1T4S9TCgv/vroot_1PGXVV . . . , May 14, 2003, pp. 1-2.

"3M Reflectivity", © 3M 1997, 2 pages.

3M, "3M Scotchlite™ Diamond Grade™ LDP Reflective Sheeting Long Distance Performance (LDP) Series 3970", Product Bulletin 3970, Feb. 2003, pp. 1-7.

3M, "3M Scotchlite™ Transparent Screen Printing Ink Series 2900", Product Bulletin 2900, Aug. 2001, pp. 1-3.

3M, "3M Stanmark™ Intersection Grade Tape Series A420n and N420 Tape, Series L420 Sheeting and Series SMS-L420 Precut Symbols and Legends", Product Bulletin 420, Feb. 2002, pp. 1-3.

3M, "3M Hand Squeeze Roll Applicators HSRA-48, HSRA-36 and HSRA-12", Information Folder 1.6, Oct. 1997, pp. 1-7.

3M, "Series 145 Removable Black Line Mask", http://products3.3m.com/catalog/us/en001/safety/traffic_control/node_GS1LG1J44Dbe/ro . . . , May 14, 2003, 1 page.

"Top Tape & Label", www.levitt-safety.com, 3 pages.

3M, "3M Stanmark™ High Performance Contrast Tape Series 380I-5" Product Bulletin 380I-5, Jul. 1998, 4 pages.

Select File History from related U.S. Appl. No. 11/186,310, filed Jul. 21, 2005, dated Jul. 3, 2008 through Dec. 3, 2008, 58 pages.

Select File History from related U.S. Appl. No. 10/633,943, filed Aug. 4, 2003, dated Jan. 24, 2005 through Dec. 4, 2008, 385 pages.

* cited by examiner

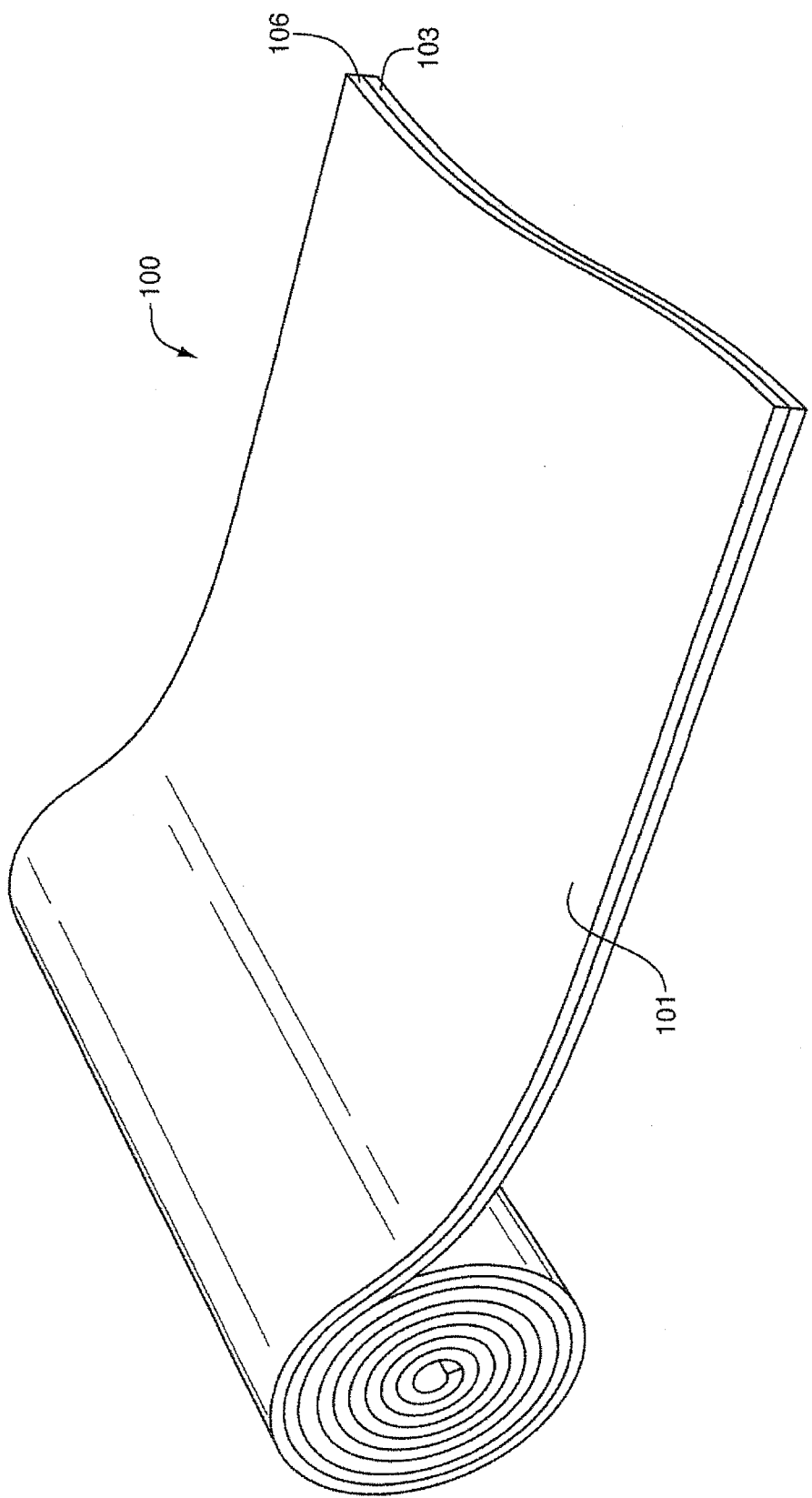

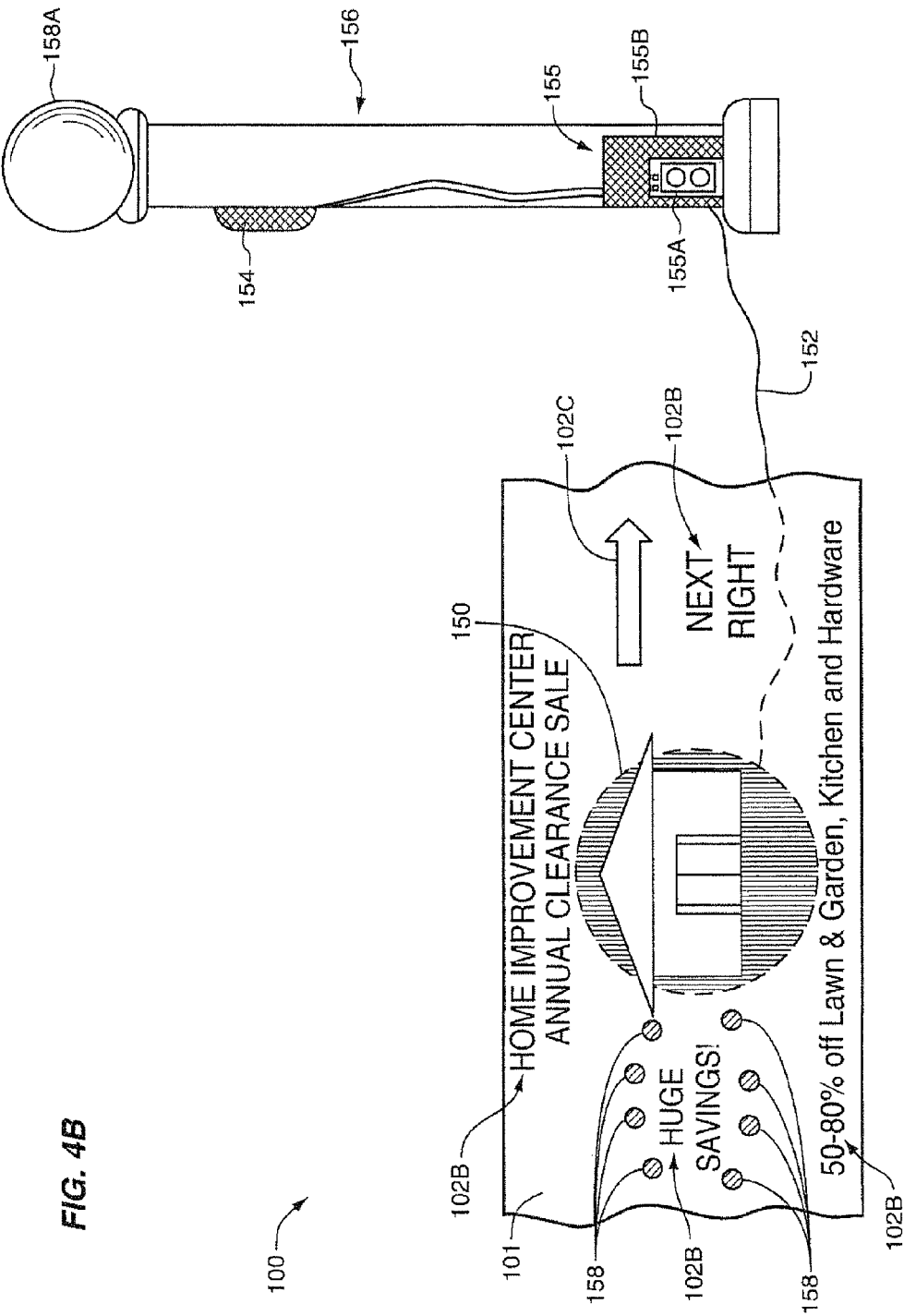

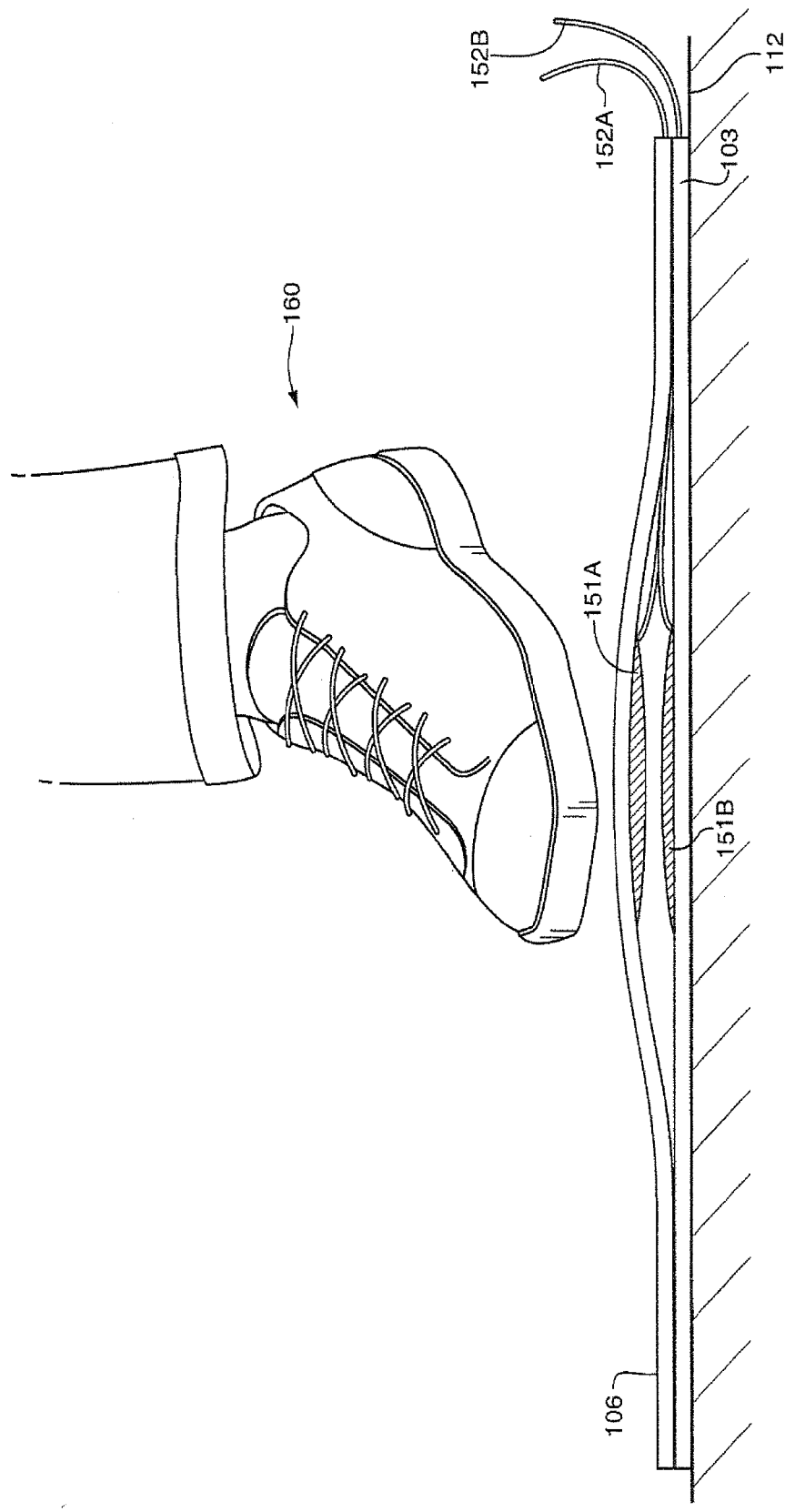

COLD CRACK ADDITIVE ON PAVING ADVERTISING AND RELATED METHODS

RELATED APPLICATIONS

This application claims the benefit of priority to U.S. Provisional Patent Application Ser. No. 60/988,676, filed Nov. 16, 2007, which is incorporated by reference herein. This application as also a continuation-in-part of U.S. patent application Ser. No. 11/186,310 filed Jul. 21, 2005, which is a continuation-in-part of U.S. patent application Ser. No. 10/633,943 filed Aug. 4, 2003, now abandoned both of which are incorporated herein by reference.

BACKGROUND

Pavement marking was an early method used for directing motor and foot traffic. In the era of brick roads, different colored bricks were used to convey safety information. Later, paint was used; however, early paints had poor durability under the demanding conditions of foot and motorized traffic and the environment. In addition, pavement painting was usually a time consuming and disruptive task. Paint required drying time and traffic had to be kept off the painted surface until drying was complete. Rain, cold and heat adversely affected the drying time and the success of the operation. Once paint was dry and in use, it was often difficult to remove when changes in the traffic pattern were required.

More recently, pavement tapes have been used for marking pavement, for example, to delineate pedestrian crossings and lane markings. Although pavement tapes could be applied more quickly than paint, reducing traffic disruptions, early pavement marking tapes had limited visibility and poor durability under many road conditions. Improved tapes permitted long-term or temporary application and provided skid resistance, low-temperature durability, high-temperature durability and reflectivity.

SUMMARY

Despite advances in pavement-marking tapes, motorists and pedestrians have been provided with minimal information, such as sidewalk and crosswalk delineation, centerlines and other road markings, at best. On the other hand, Applicant's information-conveying pavement tape may provide, for example, information of a commercial nature, and in a manner that is efficient, effective and safe. "Commercial information", as used herein, may include the following: commercial advertising, for example, advertising of available real-estate, tourist attractions and businesses such as home improvement stores, hardware stores, department stores and other shops, restaurants, bars, beer, liquor, grocery stores, gas stations, hotels, motels, entertainment venues and the like;
  event advertising, such as advertising for sales, concerts, theater productions, festivals and other events;
  directional information, for example, maps, compass points, mile markers and directions to area businesses or tourist attractions;
  tourist information such as interesting area facts, things to do in the area, operating hours of area attractions and the like;
  solicitations, for example, by community agencies or charitable institutions; and/or
  public safety information, including information about traffic conditions, road conditions, detour requirements, turn requirements, the presence of pedestrians, and safety reminders such as "be a designated driver," and the like.

The claims at the end of this specification set forth a full and accurate description of Applicant's information-conveying pavement tape, which may illustratively include one or more of the following embodiments.

In one embodiment, a paving advertisement comprises an elongated flexible tape body having a base substrate layer with front and rear faces, the front face comprising at least one text message that conveys information where the base substrate layer is treated with a cold crack additive for increasing strength and flexibility.

In one embodiment, a method of conveying information from pavement includes treating a base substrate layer of an elongated flexible tape with cold crack additive; printing at least one text message conveying information on a front face; combining an upper substrate layer with the front face of the base substrate layer; and bonding a rear face of the base substrate layer to a section of pavement.

DESCRIPTION OF THE DRAWINGS

FIG. 3C depicts a roll of continuous pavement tape.

DETAILED DESCRIPTION OF THE DRAWINGS

Figure 1:
FIG. 1 depicts a top view of a section of a continuous pavement tape.

FIG. 1 depicts a top view of a section of a continuous pavement tape 100. An elongated, flexible tape body 101 includes a series of symbols 102 arrayed on the surface of tape body 101. As shown, symbols 102 define the first three letters of the English alphabet; however, it will be understood and appreciated that symbols 102 may be any combination of letters, numbers or other symbols. Symbols 102 may be letters of a language. For example, in an English speaking country, English language symbols may be chosen for a pavement tape 100, whereas Arabic language symbols may be chosen for pavement tape 100 for use in an Arabic-speaking country. As shown in FIG. 1, tape body 101 has parallel sides; however, depending upon the application, tape body 101 may have sides of a variety of shapes, for example, non-parallel sides, matching or unmatched curved sides and configurations having one straight side and one curved side.

Pavement tape 100 may serve as a pavement sign conveying commercial information, based on the letters of a language. For example, pavement tape 100 may serve to convey information to people traversing the pavement, or to motorists. Pavement signs based on the letters of a language may serve a variety of purposes, including delineating parking spaces in a parking lot, advertising and directing consumers to businesses proximate the parking lot, conveying traffic conditions, road conditions, detour requirements, turn requirements and/or the presence of pedestrians. Lettered pavement signs may, for example, delineate parking areas for the disabled or advertise goods or services of local, national or international purveyors. In other contexts, lettered pavement signs may convey solicitations by community agencies or charitable institutions, directions to community landmarks, public safety reminders, such as "know when to say when," "be a designated driver," and the like. When sponsored by a company or business, such signs may also include the name of the sponsor, allowing the sponsoring company, for example, to leverage their charitable support by advertising and associating their company name with the charity.

Pavement tape 100 may convey commercial information of a particular interest to out of town motorists and pedestrians. For example, pavement tape 100 may include symbols 102 that convey information about and/or directions to tourist attractions; restaurants; bars; hotels; coffee shops; grocery stores; gas stations; entertainment venues; and commercial establishments such as home improvement stores, hardware stores, department stores and malls. Symbols 102 may also convey advertisements for area real-estate and/or special events including concerts, plays, sales, and festivals, for example.

Figure 2:
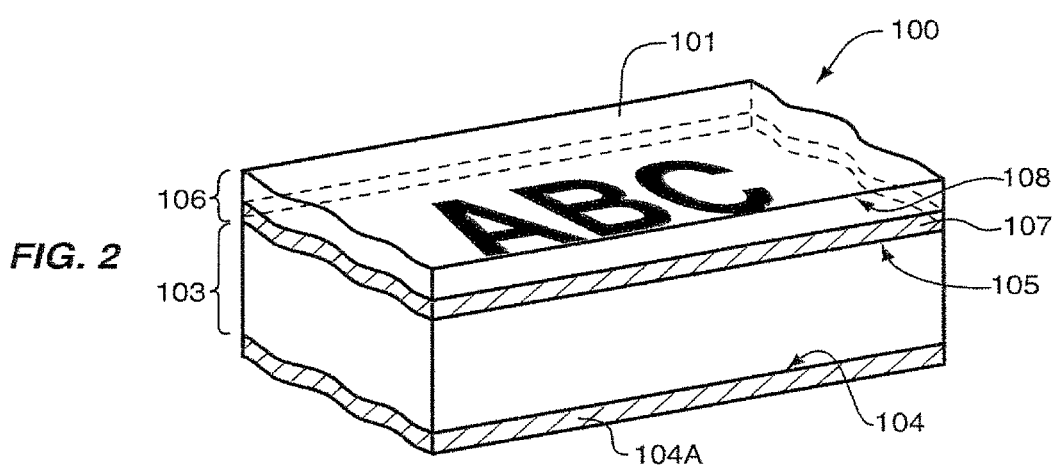
FIG. 2 depicts a perspective view of the pavement tape of FIG. 1.

FIG. 2 depicts a perspective view of pavement tape 100 with tape body 101. As shown in the embodiment of FIG. 2, tape body 101 includes a base substrate layer 103 having a rear face 104 and a front face 105. In one embodiment, base substrate layer 103 is formed with material that may be printed upon, such as a film. Such a film is for example vinyl film, such as PVC film having a thickness of about 0.003-0.004 inches between front and rear faces 105, 104. In one embodiment, base substrate layer 103 is a glossy, white PVC film label having a thickness of about 0.1 mm and a weight of about 130 g/m$^2$; however, alternate colors, weights, thickness and finish may also be used. Base substrate layer 103 may also be a calendared vinyl film, such as a 3.2 mil Ritrama Duramark® calendared vinyl film.

Thus, symbols 102 may be printed upon front face 105 of base substrate layer 103. Symbols 102 may be digitally printed upon front face 105, for example using a solvent-based ink jet printer. For outdoor applications, a long-lasting outdoor ink, for example a Scitex® vision 200 series five year outdoor ink, may be used in combination with a Scitex® printer for printing symbols 102 upon front face 105.

A first adhesive layer 104A is for example a pressure sensitive adhesive that couples with rear face 104. The pressure sensitive adhesive may be a weather- and solvent-resistant acrylic adhesive having the following specifications:

thickness≈0.05 mm;
basic weight≈130 g/m$^2$;
initial tack≧4;
holding power≧8;
solvent retention≦1.5;
temperature range≈−25° C.-80° C., and
release force 15 kg/25 mm.

First adhesive layer 104A may alternatively be a 0.005 inch rubber adhesive; Ritrama Duramark® part number 3-8590-10000 (also known as VYW-3.25-M-86-50G) may serve as tape body 101 and adhesive layer 104A, for example.

An upper substrate layer 106 protects front face 105 of base substrate layer 103. Upper substrate layer 106 includes a second adhesive layer 107 at least partially covered by a protective layer 108, for example, a vinyl film. Upper substrate layer 106 is for example a pressure sensitive, weather-resistant acrylic adhesive covered with an 18 mm, 235 g/m$^2$ vinyl PVC film. The acrylic adhesive layer 107 may thus have the following specifications:

thickness≈0.028 mm;
basic weight≈28 g/m$^2$;
initial tack≧9;
holding power≧48 hours;
temperature range≈−25° C.-50° C.;
180° C. peel adhesive≈0.005 kg/inch, and
release force≈0.0045 kg/25 mm.

A smooth, transparent PVC film having a matte finish may provide for easy viewing of symbols 102 while reducing glare from sunlight, streetlights or headlights, for example.

Protective layer 108 may be a suitable protective material, for example a siliconized paper layer, and adhesive layer 107 may be a suitably strong, weather resistant adhesive. Upper substrate layer 106 is for example a plasticized embossed polyvinyl chloride, poly-acrylic ester based adhesive covered with siliconized paper, such as 7.4 mil vinyl GBC Arctic™ Grain produced by GBC Industrial and Print Finishing Group.

Upper substrate layer 106 joins with base substrate layer 103 at front face 105. For example, upper substrate layer 106 may be joined with base substrate layer 103 by placing upper substrate layer 106 atop base substrate layer 103 such that second adhesive layer 107 contacts and adheres to front face 105. The joined substrate layers 106, 103 may be fixed together, for example, by laminating (e.g., cold laminating) upper substrate layer 106 to base substrate layer 103.

Upper substrate layer may include a release tape for protecting second adhesive layer 107. For example, Kraft paper coated with polyethylene (PE) and silicon, such as a 120±6 g/m² PE lame paper may be releasably bonded to second adhesive layer 107. Such a release tape is removed from second adhesive layer 107 prior to placing upper substrate layer 106 atop base substrate layer 103.

As shown in the perspective view of FIG. 2, tape body 101 is relatively thick, and not necessarily to scale. And there is no requirement for this particular thickness. The thickness of tape body 101 is a matter of design choice, depending on the intended application. The size and orientation of symbols 102 is also a matter of design choice. As shown in FIGS. 1 and 2, symbols 102 of pavement tape 100 are approximately half the width of tape body 101, and are positioned in a line with the vertical axis of the symbols perpendicular to an edge of tape body 101. This size, position and orientation of symbols 102 is not a requirement, but rather is application dependent. At one extreme, the symbols may take up close to the entire width of the tape. At the other extreme, the symbols may be as small as permitted by the application. For example, smaller symbols may be required where symbols are stacked on top of one another across the width of the tape. Depending upon the application, the symbols may also vary in height as compared to one another. Furthermore, symbols 102 may vary in position and orientation. For example, there is no requirement that a symbol or symbols be oriented with a vertical axis perpendicular to an edge of tape body 101. Depending on the application, a symbol may have a broad range of angular orientations relative to one or both edges of tape body 101. Additionally, symbols may have a broad range of angular orientations relative to one another. For example, the vertical axis of one symbol may be perpendicular to the vertical axis of another symbol.

Figure 3A:
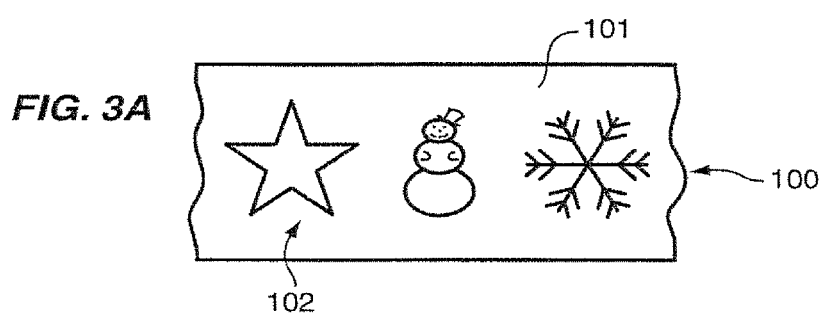
FIG. 3A depicts a top view of a section of another continuous pavement tape.

As illustrated by FIG. 3A, the symbols of pavement tape 100 also may be non-language symbols. FIG. 3A depicts a top view of a section of another continuous pavement tape 101. The symbols 102 of this pavement tape are fanciful, comprising a star, a snowman and a snowflake. Symbols 102 also could relate to motorist activity or safety. Thus, symbols 102 could be turn arrows, stop indicators, road condition indicators, detour indicators, pedestrian or crosswalk indicators, bicycle lane indicators and/or disabled indicators. Beyond this, symbols 102 may be graphic representations or photographs depicting commercial establishments such as hotels, motels, bars, eating establishments, shopping centers, gas stations and/or other services of interest to motorists, cyclists and/or pedestrians. As used herein, the term "motorist" includes operators and passengers of vehicles, including cars, trucks, buses, motorcycles and other known vehicles. Symbols 102 may thus include both language-based symbols to form a composite message and/or advertisement for the motorist, cyclist or pedestrian.

Figure 3B:
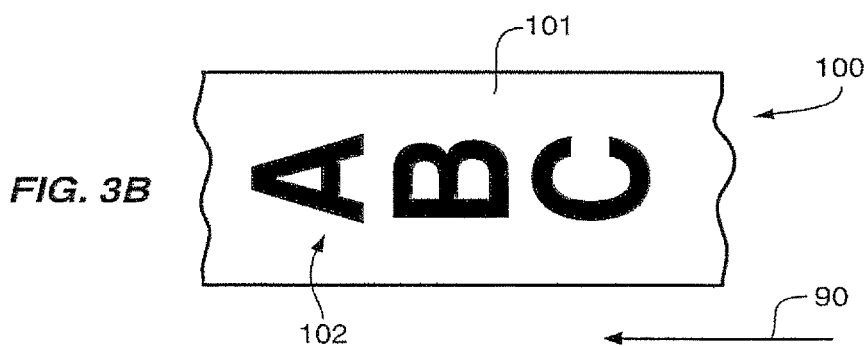
FIG. 3B depicts a top view of a section of another continuous pavement tape.

As shown in FIG. 3A, the bases of symbols 102 are disposed along the horizontal axis of tape body 101. However, as previously noted, symbols 102 may have a broad range of angular orientations relative to one or both edges of tape body 101. For example, FIG. 3B shows alpha-numeric symbols 102 with their sides oriented along the horizontal axis of tape body 101, such that a motorist, cyclist or pedestrian approaching tape body 101 and moving in the direction of arrow 90 may easily read symbols 102. Continuous pavement tape 100 may be made, integrated or provided as a roll 10, for example as shown in FIG. 3C.

Figure 4A:
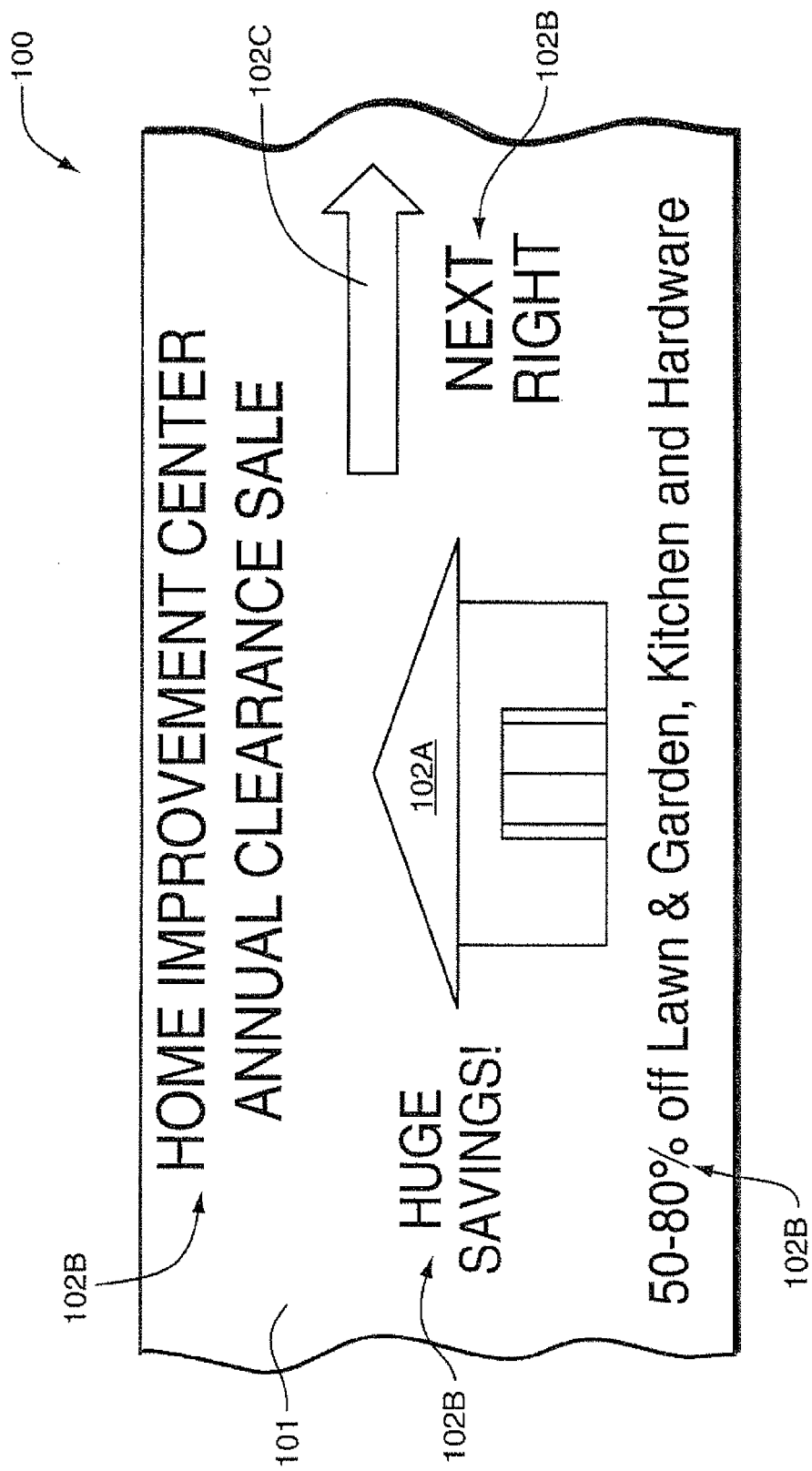
FIG. 4A depicts a top view an information bearing pavement tape including a composite advertisement conveying commercial information.

FIG. 4A shows a top view of an embodiment of a pavement tape 100 with symbols 102A-C forming a composite advertisement conveying commercial information. Symbol 102A depicts a building, for example, a home improvement center. Symbols 102B are alpha-numeric symbols conveying information about a clearance sale and directions to the sale. Symbol 102C is an arrow pointing in the direction of the sale. Such a pavement tape may, for example, be affixed to pavement such that motorists, cyclists and pedestrians may read the composite advertisement as they approach pavement tape 100. For example, such a pavement tape may be affixed to pavement in a parking lot, in order to advertise a business proximate to the parking lot to motorists driving or parking in the lot. Such a pavement tape may provide directions to the business or a department of the business, for example when the business is a home improvement store or other business including multiple departments.

Pavement tape 100 may be placed at or before an intersection, such that approaching motorists, cyclists and pedestrians may read the composite advertisement while approaching the intersection. Pavement tape 100 may also be placed in the center of an intersection, thus allowing motorists, cyclists and pedestrians the opportunity to read pavement tape 100 while stopped at a traffic light. As shown in FIG. 4, the composite advertisement formed by symbols 102A-C is oriented along the long, horizontal axis of tape body 101. However, as shown in FIG. 3A, the composite advertisement may also be oriented along the vertical axis of tape body 101 such that pedestrians approaching a pavement tape placed at a crosswalk are able to easily read the tape. Other orientations of the composite advertisement (e.g., symbols 102A-C) are within the scope of this disclosure.

Alpha-numeric symbols 102 may be printed onto tape body 101 in a color or colors contrasting with the color or colors of tape body 101. For example, symbols 102 may be digitally printed onto tape body 101 using a palette of outdoor inks that contrast with the colors of tape body 101. In a specific example, tape body 101 may be red and black; symbols 102 may be printed in red and white ink upon the black portion or portions of tape body 101, and printed in black and white ink upon the red portion or portions of tape body 101.

FIG. 4B shows, in a top view, an information-conveying pavement tape 100 with audio and lighting components. An audio switch 150 (further detailed with respect to FIG. 4C) and one or more connected wires 152 are shown disposed beneath upper substrate layer 106 of tape body 101. Switch 150 may be connected to a power source (not shown), and may be communicatively connected to a speaker 154, operable for playing pre-recorded audible information, by wires 152. Speaker 154 is shown attached to a light post 156; however, it will be understood and appreciated that speaker 154 may be attached at any convenient location, and that wires 152 may be disposed in, on or underneath tape body 101. Further, wires 152 may not be needed when switch 150 and speaker 154 are in wireless communication, or when switch 150 and speaker 154 are replaced by or utilized with pressure-activated computer sound chips.

Further, it should be apparent that switch 150 may also connect to audio storage and playback circuitry 155, which then also connects to speaker 154 by wires 152. Audio storage and playback circuitry 155 may include a recorder 155A, to record and/or store audible information for playback, and/or a memory (not shown), to store recorded audible information; it may also be digitally programmable. Where amplification of the played audible information is desired, for example at a busy intersection, an amplifier 155B may also be included in circuitry 155. Audio storage and playback circuitry 155 is also shown attached to light post 156; however, as with speaker 154, audio storage and playback circuitry 155 may be positioned at any convenient location (e.g., within tape body 101, such as when circuitry 155 is configured as an ASIC), and may not require wires 152 when in wireless communication with switch 150.

Switch 150 may be pressure-activated, such that pressure applied to switch 150 triggers play of pre-recorded information at speaker 154. In the embodiment of FIG. 4B, the pre-recorded information may be commercial information, such as an advertisement for a home improvement store sale; however, pre-recorded information may also include music, public safety announcements, tourist information, event advertising and/or directional information. Switch 150 may also activate lights 158 disposed within, atop, below or remote from tape body 101.

In one embodiment, lights 158 with tape body 101 are LEDs. As shown in FIG. 4B, lights 158 surround a message composed of symbols 102B. Lights 158 may also form symbols 102A-C, provide a border for tape body 101 and/or be otherwise placed so as to draw attention to part or all of tape body 101.

In an example of operation, a person's footstep upon switch 150 triggers lights 158 and/or play of pre-recorded information relating to one or more of symbols 102A-C, forming a composite audiovisual advertisement. Since one or more lights (e.g., light 158A) may be proximate to tape body 101, such a light 158A may be a streetlight, a light mounted on an adjacent building or structure, and/or one or more lights disposed elsewhere upon a section of pavement. Thus, lights 158 may delineate a crosswalk in a street or parking lot, or a curb. A timer (not shown) may also be incorporated into pavement tape 100 such that lights 158 remain illuminated for a selected time following activation of switch 150. Likewise, lights 158 and/or play of pre-recorded information may be activated by a vehicle upon switch 150, and lights 158 may delineate parking spaces or commercial advertising in a parking lot.

FIG. 4C thus depicts one embodiment of a pavement tape 100 with two electrodes 151A, 151B. Electrodes 151A, 151B are shown disposed between upper substrate layer 106 and base substrate layer 103; however, electrodes 151A, 151B may also be disposed beneath both upper and base substrate layers 106, 103, or atop upper substrate layer 106. Pressure applied to a portion of upper substrate layer 106 over electrode 151A (for example by foot 160) repositions electrodes 151A, 151B in contact (e.g., as a switch 150) and completes a circuit between electrodes 151A, 151B, wires 152 and, for example, lights 158, circuit 155, and/or speaker 154. For example, wires 152A, 152B connect electrodes 151A, 151B to an audio output source, for example speaker 154, and to audio storage and playback circuitry 155 to complete the circuit. As illustrated, speaker 154 and audio storage and playback circuitry 155 may be remote from pavement tape 100. Optionally, wires 152A, 152B may connect electrodes 151A, 151B to one or more lights 158, as described herein above. Additional wires 152 may be implemented as needed, to connect electrodes 151A, 151B to additional lighting and/or audio components.

Figure 4D:
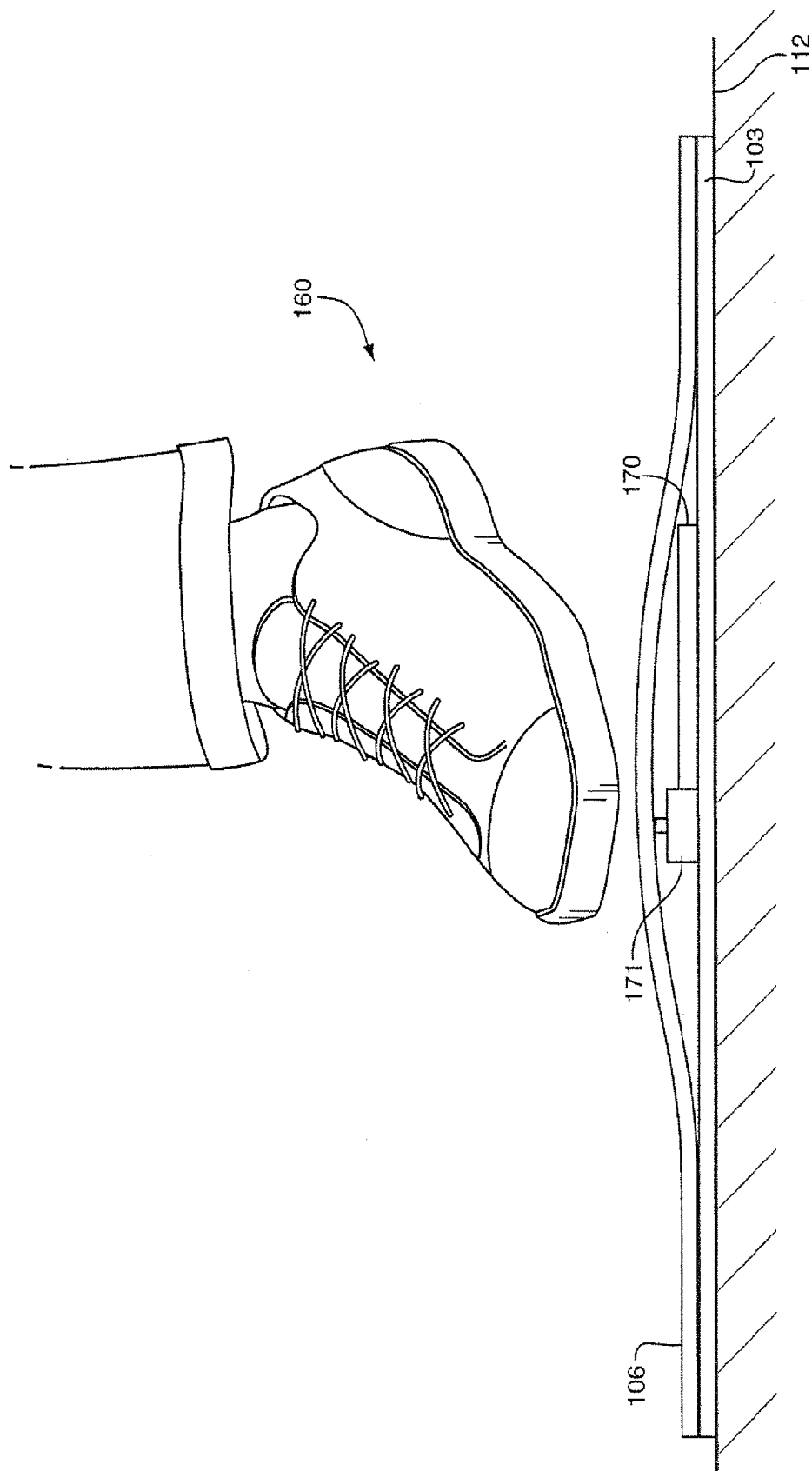
FIG. 4B shows a top view of an information bearing pavement tape including a composite advertisement with light and audio components.
FIG. 4C shows a side view of a continuous pavement tape with audio components.

In one embodiment, sound may be provided by one or more sound chips including pre-recorded information. As shown in FIG. 4D, sound chip 170 is connected to pressure-activated switch 171. Pressure upon switch 171, for example, by foot 160, initiates play of the pre-recorded information from sound chip 170. Multiple sound chips 170 and switches 171 may be included in one pavement tape, such that a person "plays" a composite advertisement including a variety of pre-recorded information while traversing the pavement tape and activating switches 171. Pressure activated switches 171 may likewise activate lights 158, such that wires 152 are not needed. Switches 171 may include electrodes (e.g., electrodes 151A, 151B of switch 150) that complete a circuit upon contacting one another, thus activating sound chip 170, for example.

Pavement tape 100 may also be wholly or partly reflective. For example, symbols 102 may also be printed, in whole or in part, with a reflective ink, such that at least a portion of a symbol 102 is reflective. Alternately or additionally, at least a portion of base substrate layer 103 or upper substrate layer 106 of tape body 101 may be wholly or partially reflective, thus lending a reflective quality to at least a portion of tape body 101. Pavement tape 100 may also be made reflective by affixing glass beads thereto, for example, by affixing glass beads to the front face of the base substrate layer.

Figure 5A:
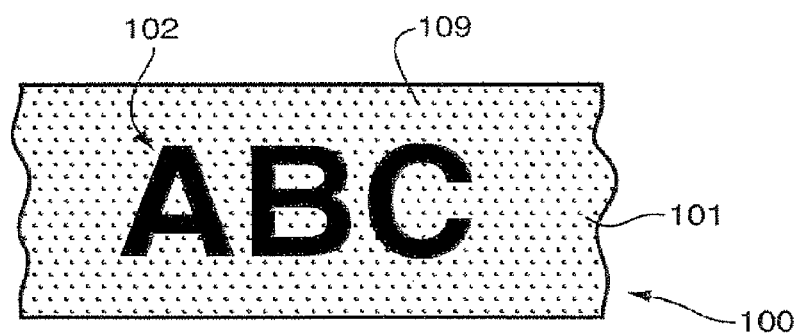
FIG. 5A shows a continuous pavement tape with reflective glass beads.

FIG. 5A thus depicts a top view of the pavement tape of FIG. 1 coated with reflective glass beads 109. Glass beads such as beads 109 are widely used for road signs and pavement markings. When automobile lights project upon reflective glass beads, the light is scattered and reflected back to the motorist. This makes it easy to see the beads. Reflective glass beads 109 may be arranged in the form of letters and other symbols to convey traffic information and the like to motorists, and to pedestrians as well.

In FIG. 5A, reflective glass beads 109 are arranged over the entire front surface of tape body 101, except that symbols 102 are not covered. A motorist viewing pavement tape 100 of FIG. 5A under automobile headlights at night will observe a field of light surrounding symbols 102, which would appear dark by contrast.

Reflective glass beads 109 are not required in the pavement tape of FIG. 5A. Reflective paint may be used in place of reflective glass beads 109. Alternately, other materials that contrast with symbols 102 may accomplish the same or a comparable result, especially when pavement tape 100 is viewed in daylight. In daylight applications, reflective glass beads may be replaced by alternative contrast materials such as bright paints and/or plastics impregnated with bright pigments. Such alternative contrast materials may be superior to reflective glass beads in daylight applications. For example, tape body 101 may usefully be coated on its top surface with a bright paint or plastic rather than reflective glass beads 109, or simply be formed of an appropriately bright material. On the other hand, symbols 102 may be formed of glass beads 109 or other alternative contrast material, leaving tape body 101 relatively dark.

There is no requirement that reflective glass beads 109 or other alternative contrast materials be placed over the entire front surface of tape body 101. Reflective glass beads 109 may be placed over a smaller area of tape body 101 if the application so dictates. Other materials may be used in areas where reflective glass beads 109 are not present. For example, a bright paint might be used to create a pavement tape that is useful in both day and night applications, or a different type of reflective glass bead might be used to enhance night performance. Similarly, an abrasive might be used to enhance traction for pedestrians as well as motorists.

Figure 5B:
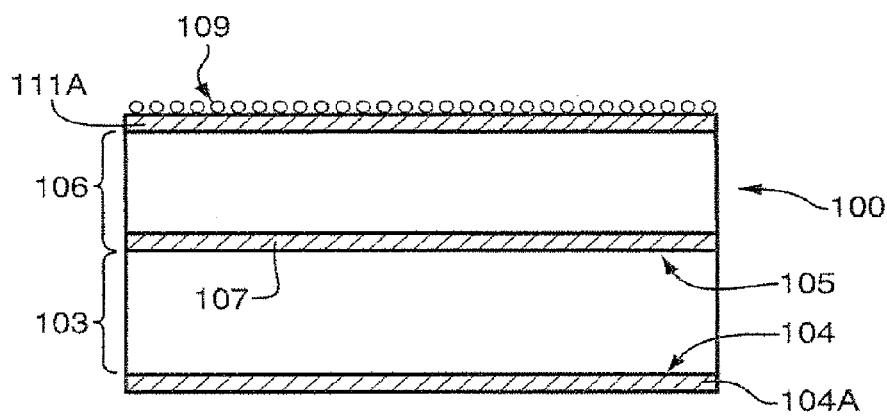
FIG. 5B depicts an end view of the pavement tape of FIG. 5A.

FIG. 5B depicts an end view of the pavement tape of FIG. 5A. Reflective glass beads 109 are held in place by reflective glass bead adhesive 111A. This layer of reflective glass bead adhesive 111A is securely fastened to both tape body 101 and reflective glass beads 109. A number of techniques, known in the art, may be used to attach reflective glass beads 109 to a substrate (e.g., to tape body 101).

Figure 6:
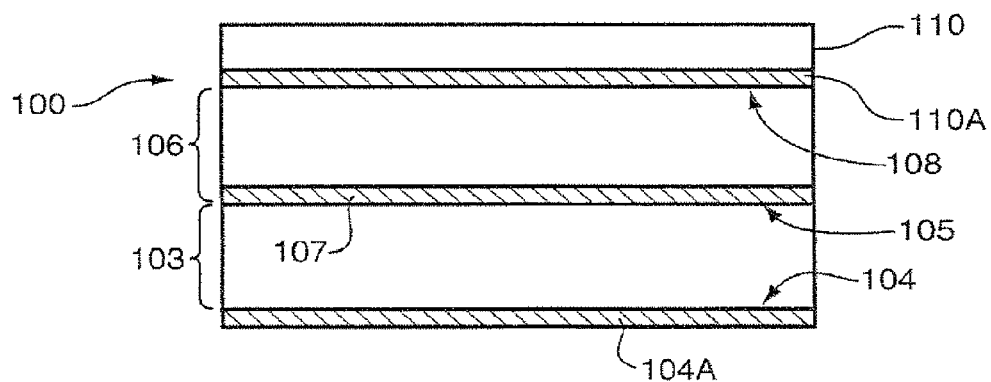
FIG. 6 depicts a detailed end view of the pavement tape of FIG. 1 with a protective tape.

FIG. 6 depicts an end view of the pavement tape of FIG. 1 bonded to a protective tape 110. In particular, protective tape 110 is bonded to pavement tape 100 by adhesive 110A. Protective tape 110 may be made from a common tape material. In one embodiment, protective tape adhesive 110A is a low-tack PSA adhesive that bonds weakly to tape body 101 but more strongly to protective tape 110, allowing protective tape 110 to be removed from the surface of tape body 101 while taking protective tape adhesive 110A with it. This leaves a clean top surface of tape body 101. Any one of a number of other adhesives may serve effectively as protective tape adhesive 110A. In some applications, protective tape adhesive 110A may be done away with altogether and the necessary release properties incorporated into the bottom surface of protective tape 110.

Figure 7A:
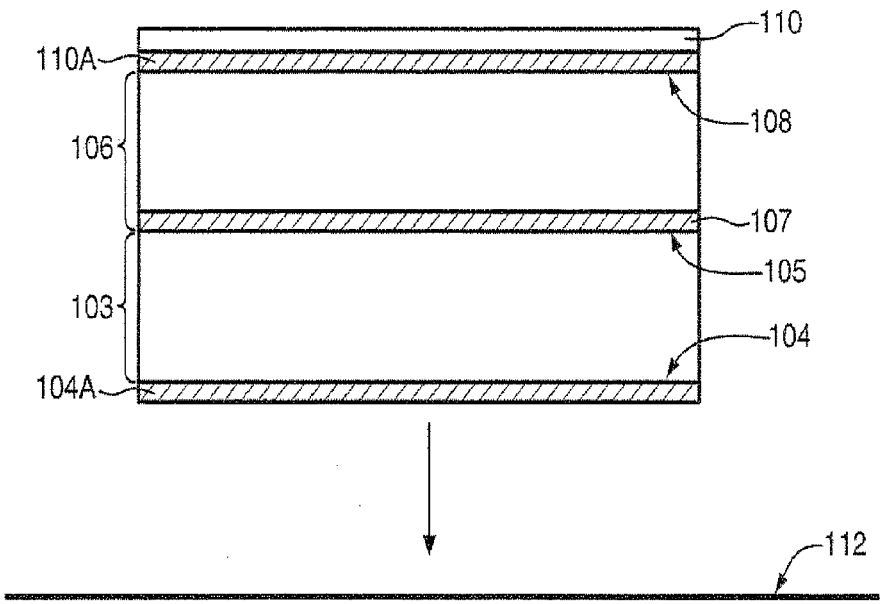
FIG. 7A depicts a process of bonding to pavement the composite tape structure of FIG. 6.

FIG. 7A depicts the composite tape structure of FIG. 6 being lowered onto an area of pavement 112. Pavement 112 may comprise any one of a wide variety of pavement materials, including bricks, concrete-based compositions, tar-based compositions and rubber-based compositions. Protective tape 110 serves to protect the top surface of tape body 101 from abrasion, denting, burning and injury of other kinds before the pavement tape 100 is installed on pavement 112. Protective tape 110 may also prevents injury during installation and serve to keep tape body 101 flat and aligned during storage and installation.

The composite tape structure of FIG. 6 is positioned over pavement 112. The exact placement of the composite structure may be determined and achieved, and the composite tape structure lowered so that first adhesive face 104A of base substrate layer 103 contacts pavement 112.

Figure 7B:
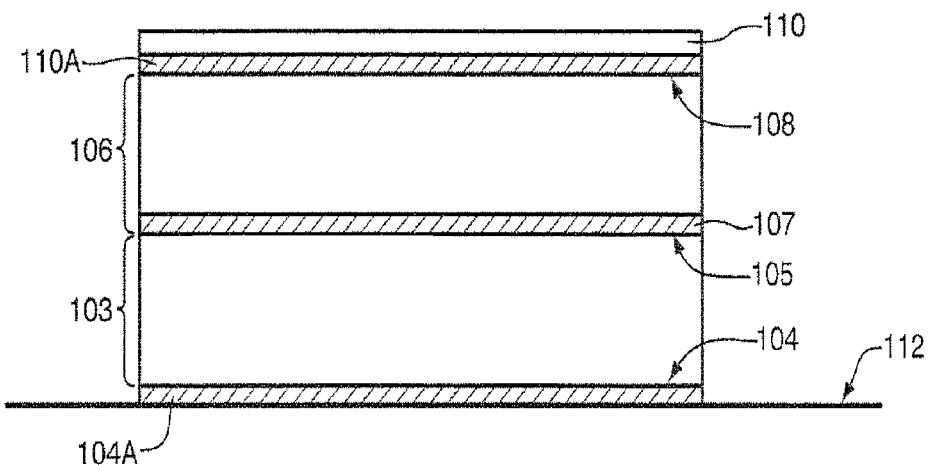
FIG. 7B depicts completion of the bonding process of FIG. 7A.

FIG. 7B depicts the completion of the installation process of FIG. 7A. The composite tape structure is pressed to pavement 112 until the bond between the composite tape structure (i.e., of FIG. 6) and pavement 112 (i.e., the bond between rear face 104 and pavement 112) has met the specifications of the particular application. Pressing, as used in connection with the bonding of the composite tape structure to pavement 112, signifies applying downward pressure, for example, manually or with a machine, by rolling, brushing with a broom, stamping, walking upon, driving upon and/or other manners of applying downward pressure. The amount and duration of bonding pressure are functions, among other things, of the type of adhesive 104A used, the composition of tape body 101, the composition and surface condition of pavement 112, and the ambient conditions at the time of application.

Figure 8A:
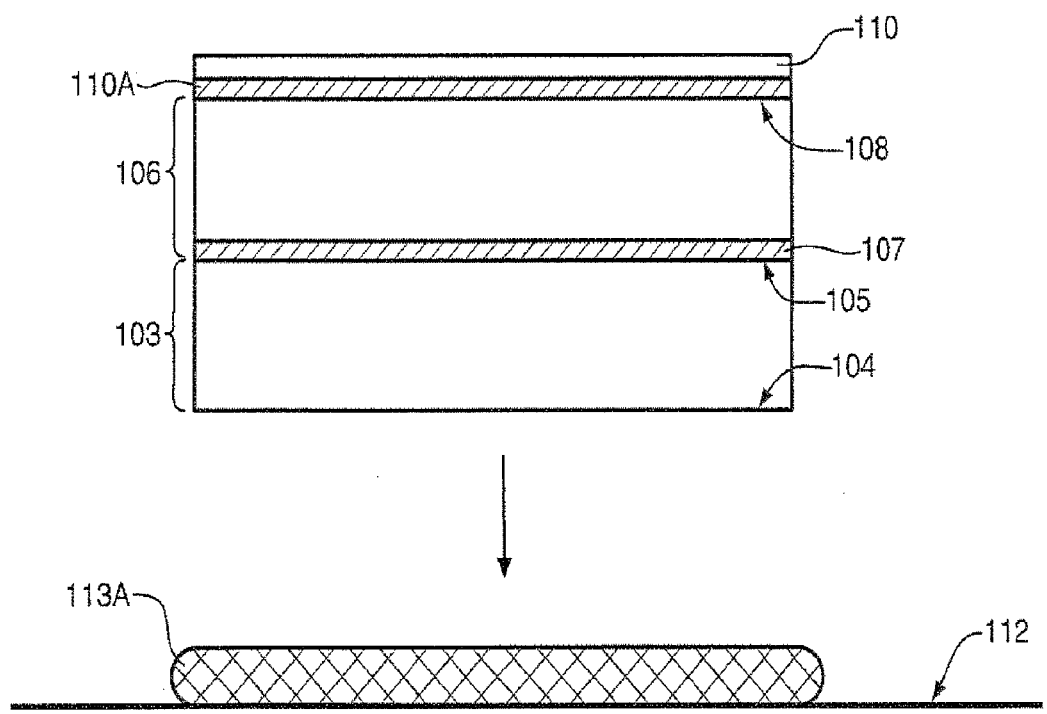
FIG. 8A depicts a process of bonding to the composite tape structure of FIG. 6. to pavement adhesive.

Although first adhesive layer 104A may serve to adhere the composite tape to pavement 112, a bed of pavement adhesive may be utilized (and in such case, first adhesive layer 104A may be omitted). FIG. 8A accordingly shows the composite tape structure of FIG. 6, minus first adhesive layer 104A, being lowered onto a bed of pavement adhesive 113A. This pavement adhesive 113A may be any one of a number of types of adhesive. Generally speaking, it will be high tack with a high cure strength and low creep, although these and other characteristics will vary with the application.

The composite tape structure is positioned over pavement adhesive 113A on pavement 112 and the exact placement of the composite tape structure is determined and achieved. The composite tape structure is then lowered so that the bottom of tape body 101 contacts pavement adhesive 113A, e.g., so that rear face 104 of base substrate layer 103 contacts pavement adhesive 113A.

Figure 8B:
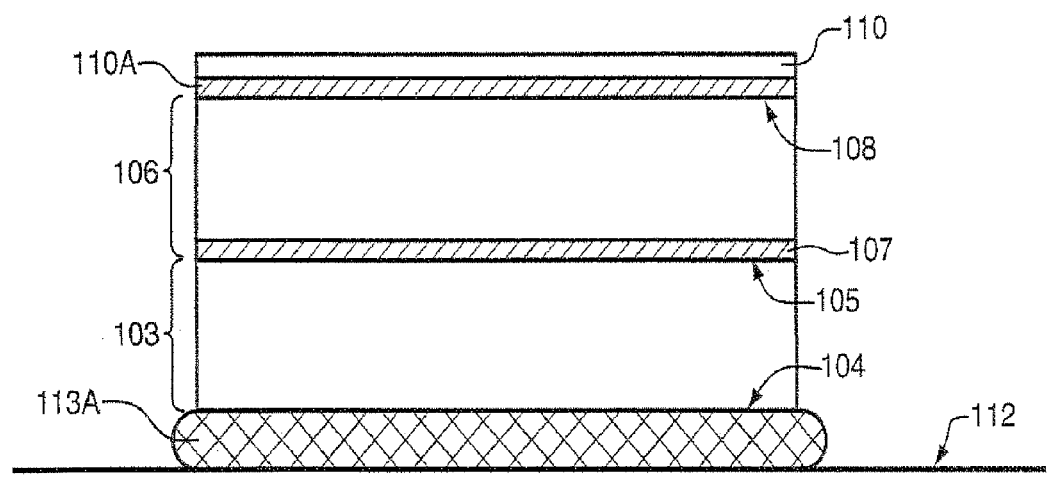
FIG. 8B depicts completion of the bonding process of FIG. 8A.

FIG. 8B depicts the completion of the installation process of FIG. 8A. The composite tape structure is pressed to pavement 112 until the bond between the composite tape structure and pavement 112 (i.e., the bond between rear face 104 and pavement adhesive 113A) has met the specifications of the particular application. Pressing, as used in connection with the bonding of the composite tape structure to pavement 112, signifies applying downward pressure, for example, manually or with a machine, by rolling, brushing with a broom, stamping, walking upon, driving upon and/or other manners of applying downward pressure. The amount and duration of bonding pressure are functions, among other things, of the type of adhesive used, the composition of tape body 101, the composition and surface condition of pavement 112, and the ambient conditions at the time of application.

Figure 9:
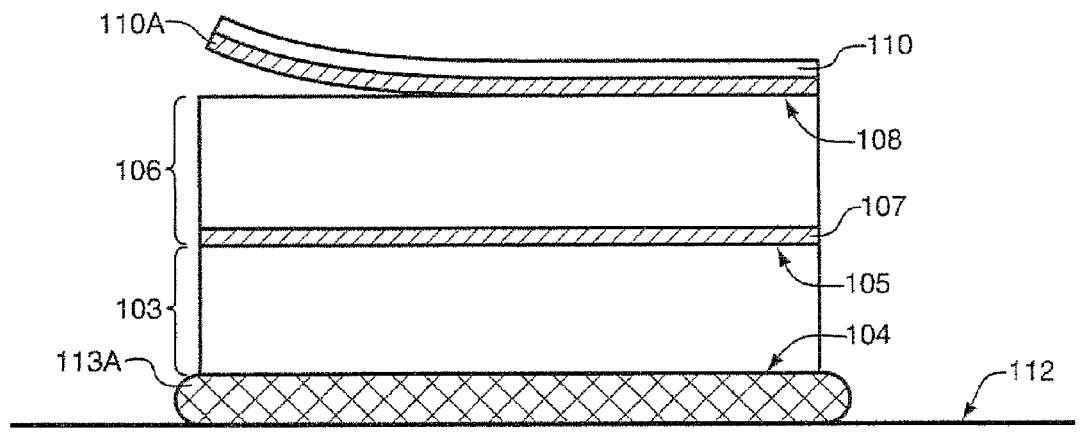
FIG. 9 depicts removal of the protective tape from the bonded composite tape structure of FIG. 6.

FIG. 9 depicts removal of protective tape 110, with protective tape adhesive 110A, from the composite tape structure of FIG. 8B. Protective tape 110, with protective tape adhesive 110A, is lifted from one exposed edge of tape body 101 and peeled from the surface of tape body 101, leaving it clean and ready for use. Protective tape 110 may be reused, recycled or discarded. FIG. 9 shows removal of protective tape 110 from a composite tape structure bonded to pavement adhesive 113A; however, removal of protective tape 110 may likewise be achieved with a composite tape structure with first adhesive layer 104A that is adhered directly to pavement 112, as in FIG. 7B.

Figure 10:
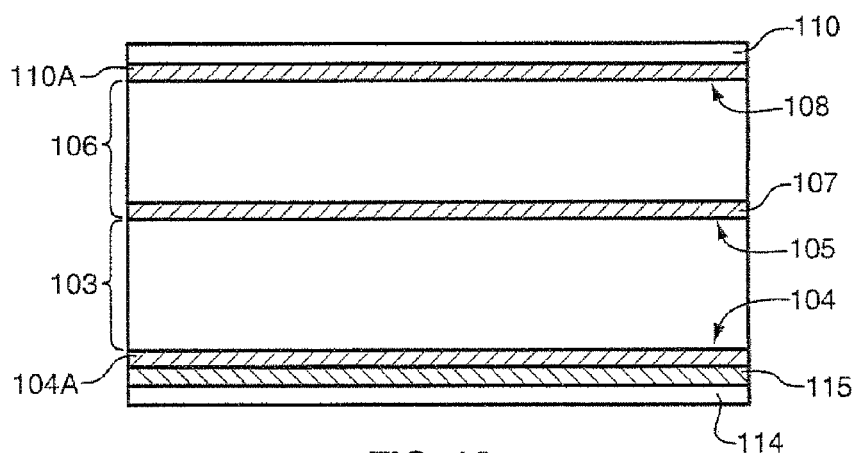
FIG. 10 depicts the composite tape structure of FIG. 6 with a release tape.

FIG. 10 depicts the composite tape structure of FIG. 6 with a releasably bonded release tape 114, including a release layer 115, used to protect adhesive layer 104A. First adhesive layer 104A at the bottom of the composite tape may be susceptible to abrasion, denting, burning and injury of other kinds. For example, dirt or dust may impair the effectiveness of first adhesive layer 104A.

Release tape 114 and release layer 115 protect first adhesive layer 104A. Release layer 115 may be a low-tack PSA adhesive that bonds weakly to first adhesive layer 104A but provides a stronger bond to release tape 114; however, a number of other adhesives may serve effectively as release layer 115. In some applications, release layer 115 may be done away with altogether and the necessary release properties incorporated into the surface of release tape 114. For example, in one embodiment, release tape 114 is a wood free paper (e.g., Kraft paper) coated with polyethylene and silicon, for example, a PE lame release paper having a thickness of about 0.125 mm and a basic weight of about 120 g/m$^2$. Polyethylene and silicon coatings may provide a releasable bond with first adhesive layer 104A, such that release tape 114 may be easily peeled or otherwise removed. Release tape 114 may be used independently of pavement adhesive 113A, such that adhesive layer 104A alone bonds tape 100 to pavement 112.

Figure 11:
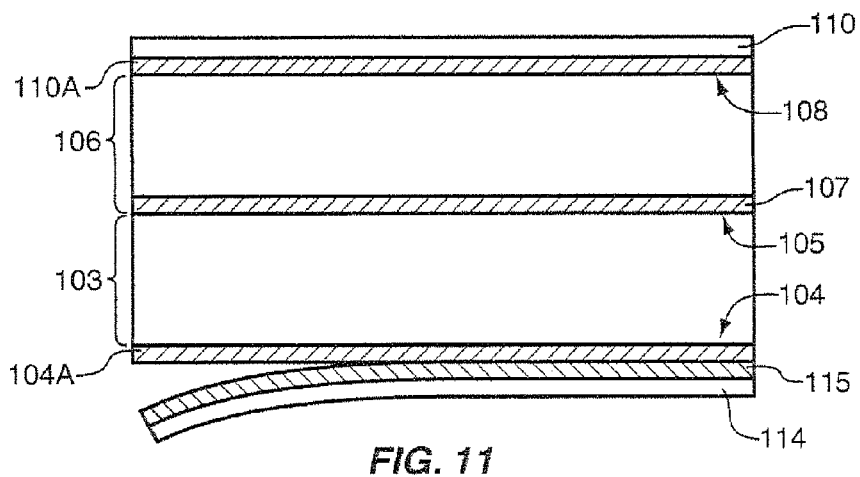
FIG. 11 depicts removal of the release tape from the composite tape structure of FIG. 10.

FIG. 11 depicts removal of release tape 114 and release layer 115 from the composite tape structure of FIG. 10. It is understood that, where first adhesive layer 104A is omitted (for example, when employing pavement adhesive 113A), release tape and layer 114, 115 may provide protection for rear face 104. Prior to bonding to pavement 112 (or pavement adhesive 113A), release tape 114 and release layer 115 are peeled from first adhesive layer 104A (or rear face 104 when adhesive layer 104A is not present), exposing it for bonding to pavement 112 (or pavement adhesive 113A). Removal of release tape 114 and release layer 115 may be delayed until the composite tape structure of FIG. 10 is at its desired location over pavement 112. This avoids the difficulties that may result from attempting to place a tape coated with a strong, active adhesive (e.g., first adhesive layer 104A). These difficulties include misplacements, wrinkled placements or incorporation of dirt into the adhesive surface, which may diminish or ruin its effectiveness.

Figure 12A:
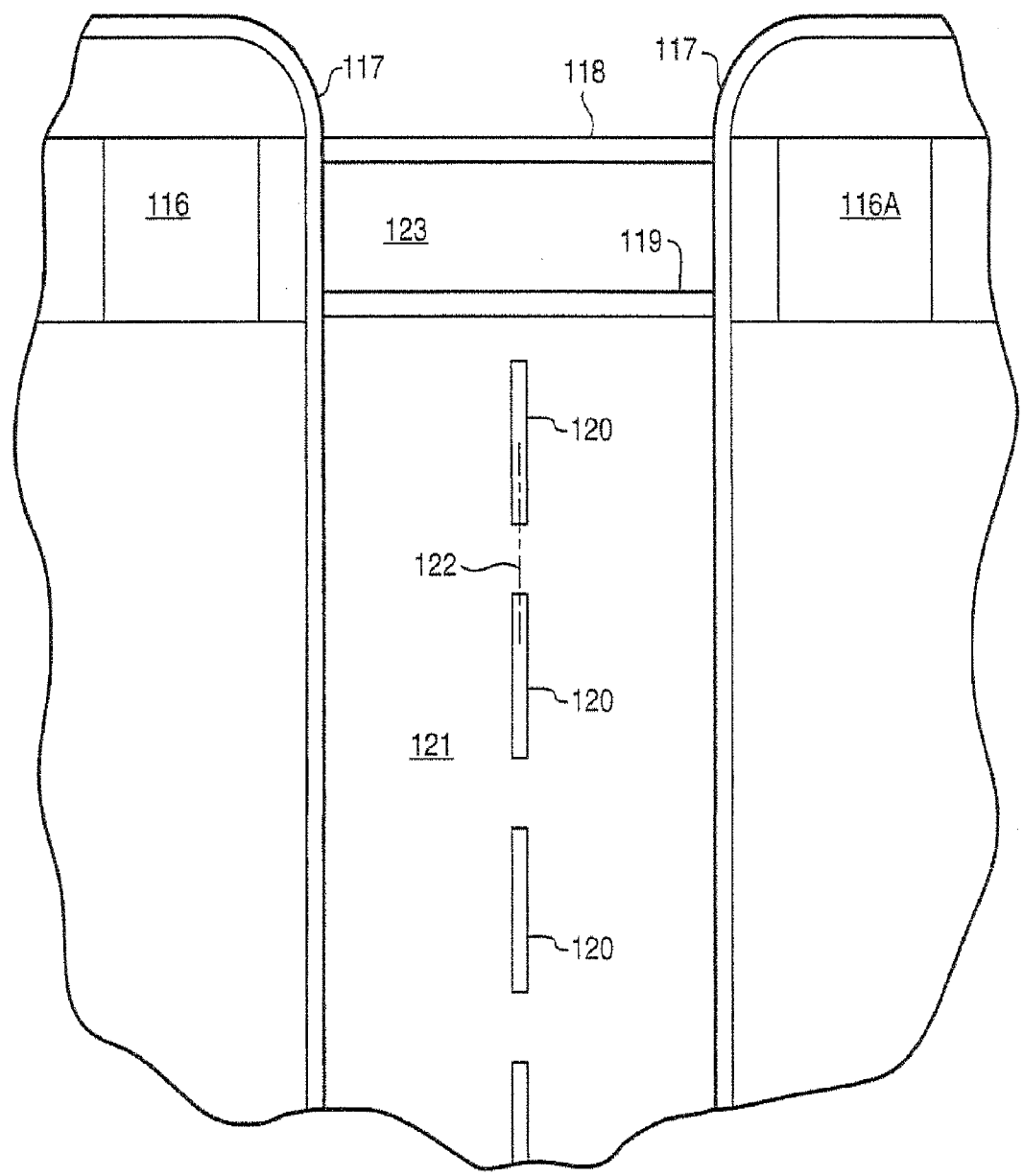
FIG. 12A depicts a section of a standard pedestrian crosswalk.

FIG. 12A depicts a section of a standard pedestrian crosswalk approximately 30 feet wide. Pavement 121 is bounded by curbs 117. Centerline 122 is defined by centerline markers 120. Pedestrian crosswalk 123 is defined by first crosswalk band 118 and second crosswalk band 119. Sidewalks 116 and 116A terminate at the ends of pedestrian crosswalk 123. All pavement markers are painted in white.

Figure 12B:
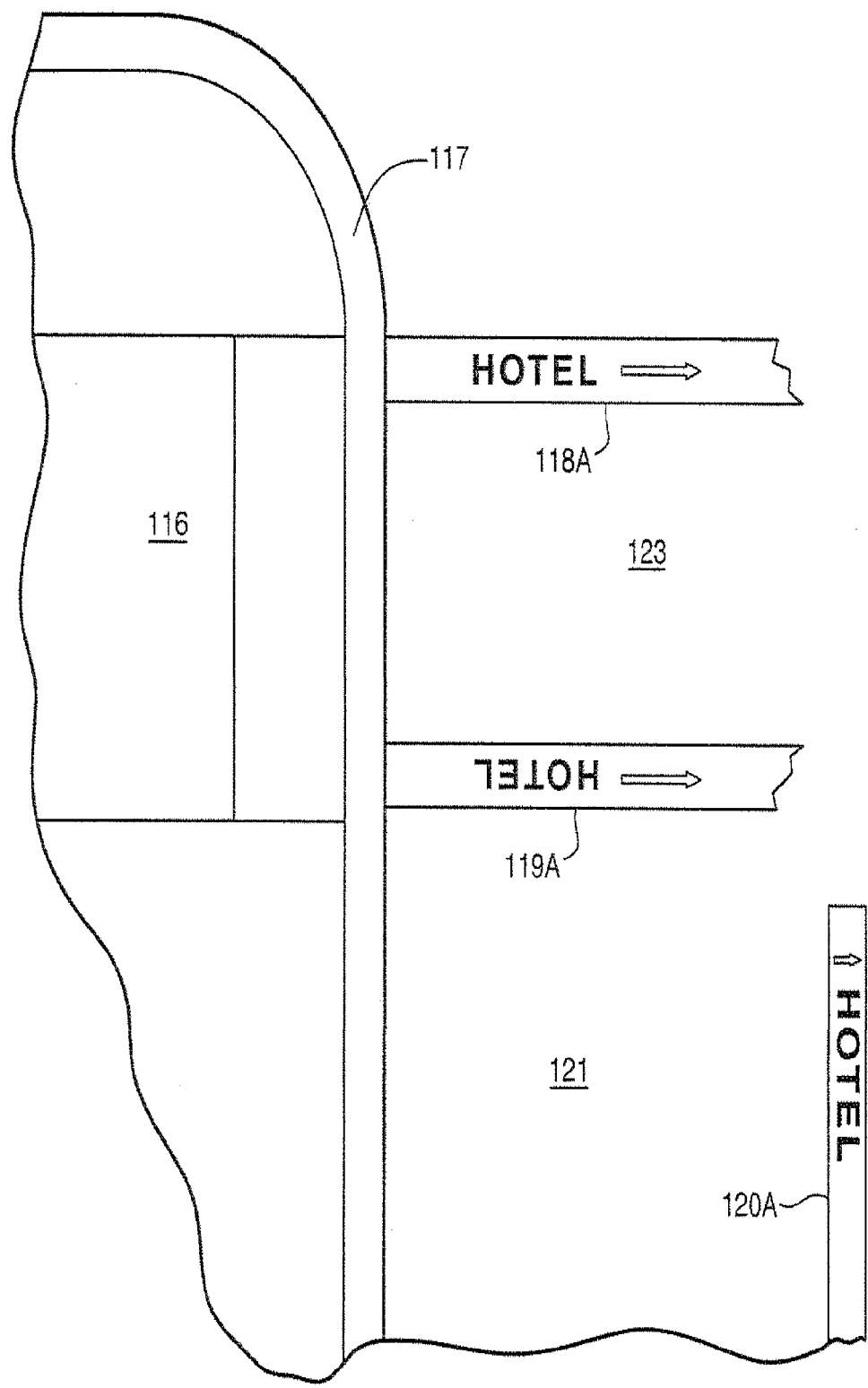
FIG. 12B depicts a detail of the pedestrian crosswalk of FIG. 12A with pavement tapes bearing commercial information.

FIG. 12B depicts a detail of the pedestrian crosswalk of FIG. 13A. The painted pavement markers 118, 119 and 120 have been replaced with pavement tapes 118A, 119A and 120A, each of which bears commercial information. In particular, each of the tapes directs the onlooker to a hotel The tapes may be white with black lettering (among a variety of color options), and may be about 6 to about 12 inches wide and bonded to pavement 121.

The lettering on first crosswalk tape 118A is oriented to face a pedestrian passing through the crosswalk 123, in either direction. The same is true of the lettering on crosswalk tape 119A. The lettering on centerline tape 120A has been oriented so that it is upright to a pedestrian passing from sidewalk 116 through the crosswalk 123, but inverted to a pedestrian passing through the crosswalk in the opposite direction. Were the lettering on centerline tape 120A oriented so as to appear inverted to a pedestrian passing from sidewalk 116 through the crosswalk 123, it would appear upright to a motorist stopped at crosswalk 123.

Figure 12C:
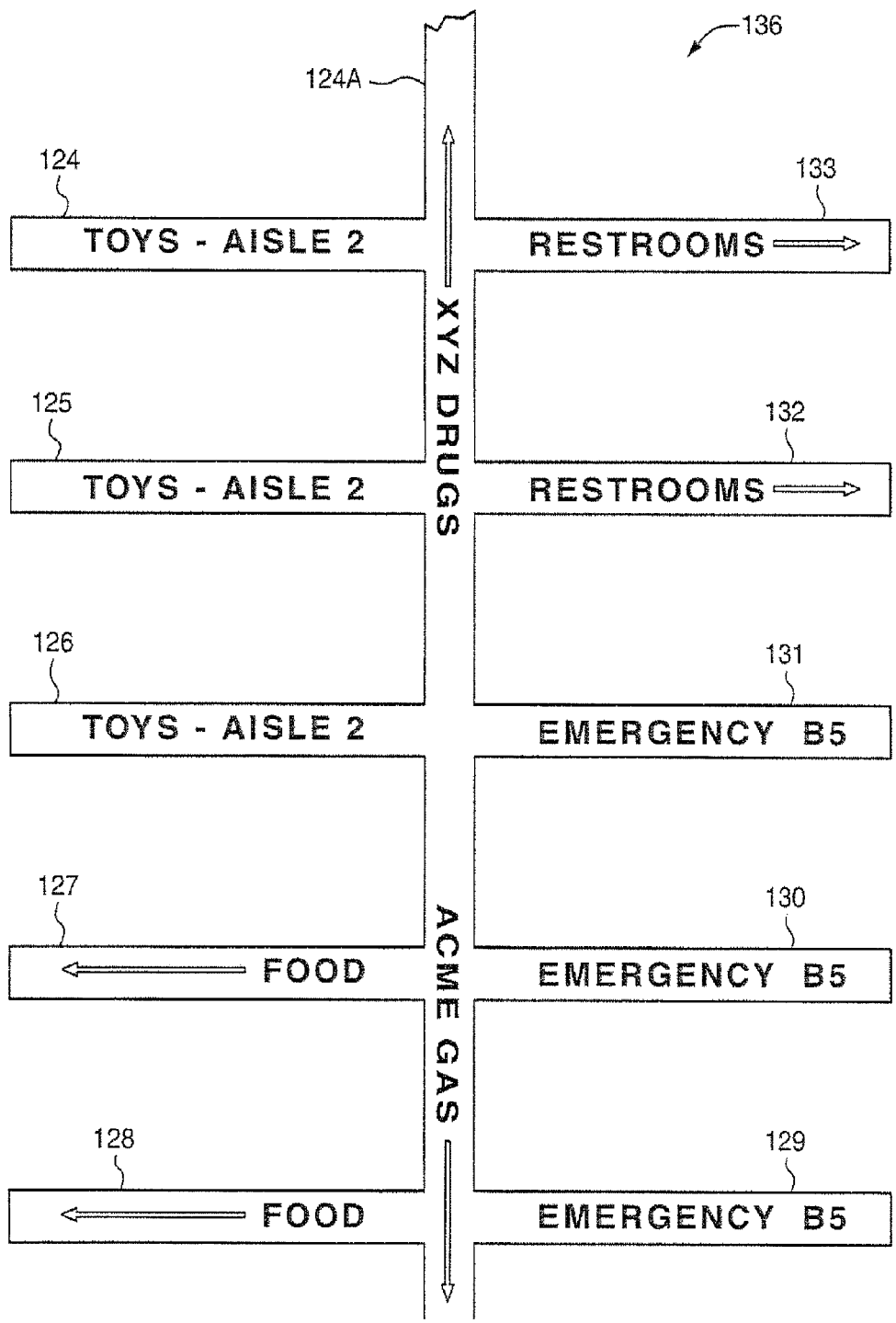
FIG. 12C depicts a section of pavement in a parking lot with pavement tapes bearing commercial and other information.

FIG. 12C depicts a section of pavement in a parking lot 136 with pavement tapes delineating parking spaces and bearing commercial and other information. Parking lot 136 may be an indoor parking structure or pedestrian walkway with limited lighting. Commercial information appears on parking tape segments 124, 125, 126, 127, 128 and on centerline tape 124A. Parking tape segments 124, 125 and 126 refer generically to "TOYS" without identifying a source but rather identifying "AISLE 2" as a location for the toys. This information appears upright to a motorist parking in one of parking spaces 125A, 125B, but inverted to someone riding in the passenger seat. The lettering of the information may be reversed so that it is inverted to the motorist but upright to the passenger.

Parking tape segments 127 and 128 refer generically to "FOOD" and, with an arrow, specify a general direction in which the food, for example a collection of fast-food establishments, may be found. The letters of parking tape segments 127 and 128 may be inverted as discussed above. Parking tapes 129 through 133 relate to services. Tapes 132 and 133 include an arrow pointing out the general direction of "RESTROOMS", while tapes 129 though 131 identify the location of "EMERGENCY" services at a specific location "B5", which may for example be a floor and sector identifier. Here again, the letters of parking tape segments 127-131 may be inverted as discussed above.

Centerline tape 124A sets forth commercial information, for example, indicating the general direction of "XYZ DRUG" and "ACME GAS" with opposing "up" and "down" arrows, respectively. These messages are upright to a motorist and passenger parking on the left side of centerline tape 124A but inverted to a motorist parking on the right side. The letters may be inverted to reverse the situation, or only one message may be inverted so that left-side motorists see, for example, "XYZ DRUG" upright and "ACME GAS" inverted. Right hand motorists, of course, would see the opposite. Alternately, each message may be displayed for both the left-side and right-side motorists. For example, each message may be displayed as a mirror image.

The tapes of FIG. 12C may be of any size and shape consistent the needs of a parking lot. The thicknesses and colors of the tapes and letters are limited only by the dictates of the application. Glass beads and other reflective materials may be used, again depending on the dictates of the application.

Figure 12D:
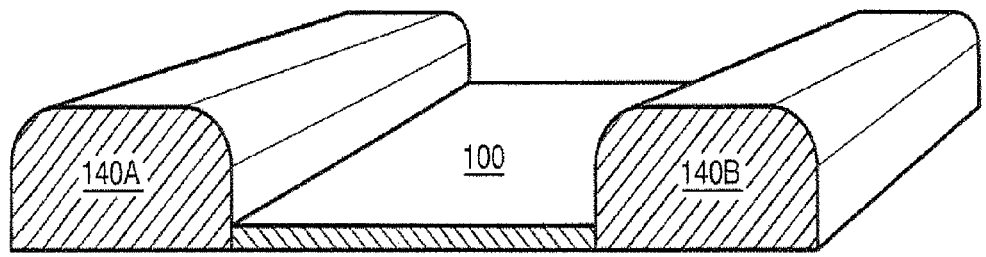
FIG. 12D depicts a mid-section of pavement marking tape with protective railings.

FIG. 12D depicts a mid-sectional view in perspective of pavement tape 100 with railings 140A, 140B. For ease of illustration, features of pavement tape 100 shown in FIGS. 1-13 are omitted from FIG. 13D. As shown, railings 140A, 140B provide protection such that pavement tape 100 lies in a protective recess between railings 140A, 140B; however, railings 140A, 140B may be greater, less than, or equal to the height of pavement tape 100, as a matter of design choice depending on the application. Railings 140A, 140B may provide protection from traffic or weather damage. Railings 140A, 140B may be built-in to pavement tape 100 or they may be separate structures placed along one or more edges of pavement tape 100. The composition of railings 140A, 140B may include, illustratively, plastic, cement, Styrofoam® or other suitable material.

Figure 13:
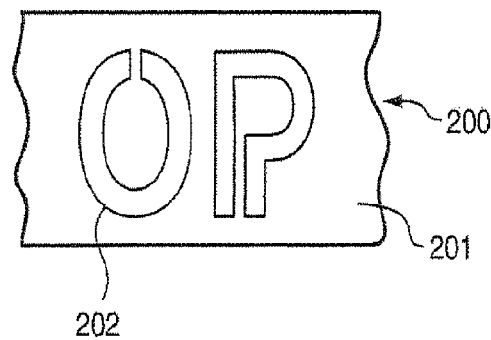
FIG. 13 depicts a top view of a section of a continuous perforated pavement tape.

FIG. 13 depicts a top view of a section of a continuous perforated pavement tape 200. This tape comprises a tape body 201 and a series of symbol perforations 202 through the tape body. The symbol perforations 202 define a series of symbols. In particular, the perforations define the letters "O" and "P" of the English alphabet.

Figure 14:
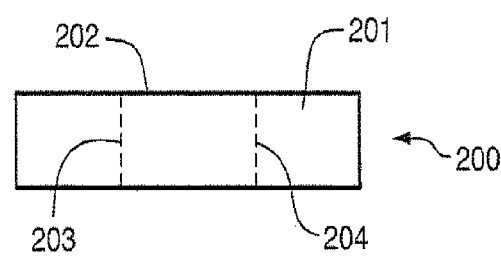
FIG. 14 depicts an end view of the tape section of FIG. 14.

FIG. 14 depicts an end view of the perforated pavement tape of FIG. 13. Dotted line 203 represents the top boundary of symbol perforations 202 and dotted line 204 represents the bottom boundary of symbol perforations 202. This view shows the projection of symbol perforations 202 through the entirety of perforated pavement tape 200; however, this depth of perforation is not required. Tape body 201 is relatively thick. As noted previously, there is no requirement for any particular thickness. The thickness of tape body 201 is a matter of design choice depending on the application. In one embodiment, tape body 201 serves as upper substrate layer 106, and includes adhesive face 107 and protective layer 108, described in detail with respect to FIGS. 2-13. Tape body 201 may also include both upper and base substrate layers and their respective faces and adhesive layers.

Figure 15:
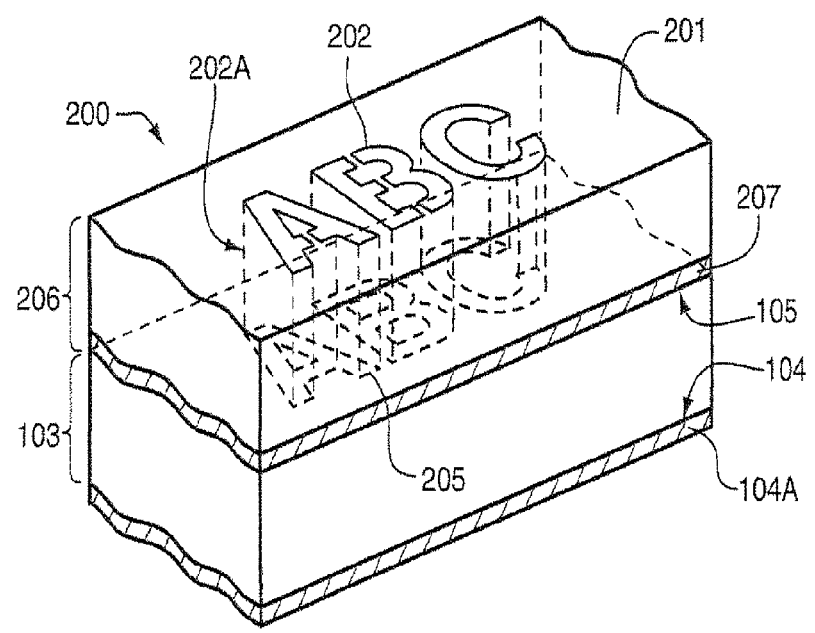
FIG. 15 depicts a perspective view of a composite tape structure including the continuous perforated tape section of FIG. 14.

FIG. 15 depicts a perspective view of a perforated pavement tape 200 including tape body 201, upper substrate layer 206 and a base substrate layer 103. Symbol perforations 202 convey the first three letters of the English language. This view shows the projection of symbol perforations 202 extending through upper substrate layer 206. Dotted lines 202A represent symbol perforations 202 where they terminate in reverse projection at second adhesive layer 207. Symbol perforations 202, as shown, expose front face 105 of base substrate layer 103. Base substrate layer 103 may be a different color than upper substrate layer 206. Base substrate layer 103 may also have different reflective properties from or be made of a different material than upper substrate layer 206, thus providing contrast between symbol perforations 202 and the unperforated portions of tape body 201. Optionally, symbol perforations 202 may extend through upper substrate layer 206 and partially or wholly through base substrate layer 103, for example, to expose pavement 112. It is not necessary, however, that symbol perforations 202 extend all the way through tape body 201, particularly where it is made of a clear material. Nor is it necessary that symbol perforations 202 have the same size at the front and back of tape body 201.

Figure 16:
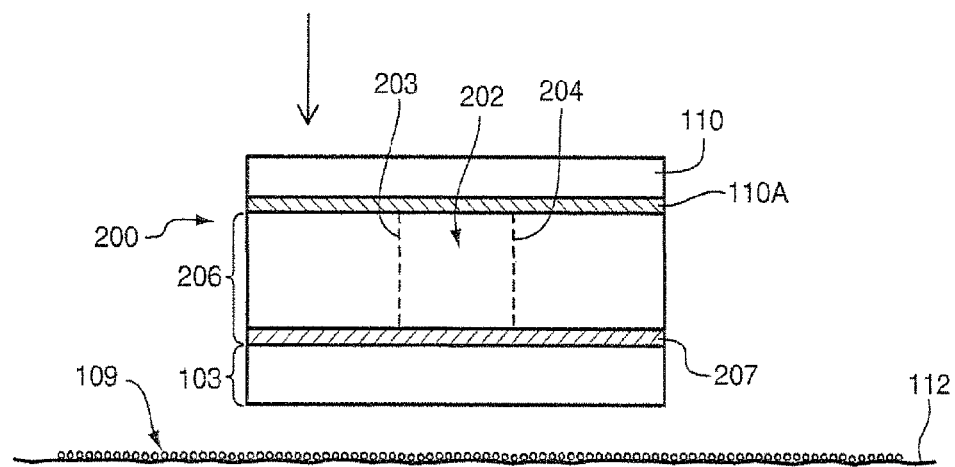
FIG. 16 depicts the bonding of the composite tape structure of FIG. 16 to a pavement pre-bonded to reflective glass beads.

FIG. 16 depicts the application of a composite tape structure like that of FIG. 6 but constructed using a perforated pavement tape as discussed in connection with FIGS. 13-15. The composite tape structure is being bonded to pavement 112, which itself has been pre-bonded to reflective glass beads 109. More particularly, the structure is being lowered for bonding to the layer of reflective glass beads 109 and subsequent removal of protective tape 110 and protective tape adhesive 110A. A motorist viewing the perforated pavement tape of FIG. 16 at night under automobile headlights (or a pedestrian with a flashlight) would observe a field of darkness surrounding symbol perforations 202, which would appear brightly lit by the underlying reflective glass beads 109, the opposite of the effect created by the pavement tape of FIGS. 5A-B. As shown in FIG. 16, symbol perforations 202 extend completely through substrate layer 206 and through base substrate layer 103. However, symbol perforations 202 may also extend only through upper substrate layer 206, where base substrate layer 103 is a translucent or transparent material that allows the transmission of light to and from underlying glass beads 109. Such an application may beneficially protect glass beads 109 from traffic or weather damage.

Figure 17:
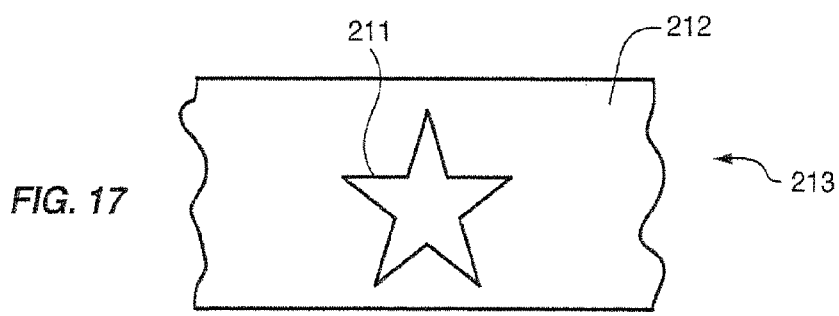
FIG. 17 depicts a mask tape with a single mask perforation.
Figure 18:
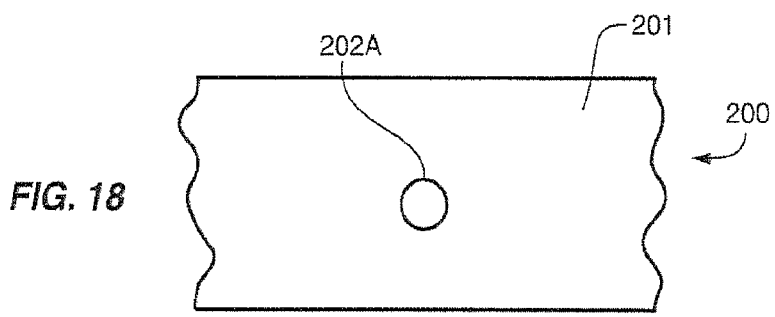
FIG. 18 depicts a perforated pavement tape with a single symbol perforation.
Figure 19:
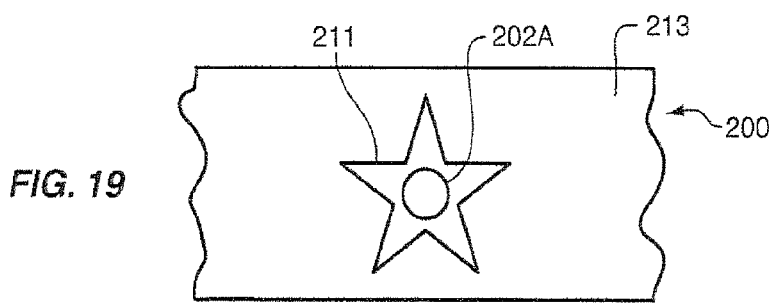
FIG. 19 depicts a placement of the FIG. 17 mask tape over the perforated pavement tape of FIG. 18.

FIG. 17 depicts a top view of a mask tape 213 comprising a mask tape body 212 and a single star-shaped mask perforation 211. The mask perforation need not be a symbol. FIG. 18 depicts a top view of a perforated pavement tape 200 comprising a tape body 201 and a single circular symbol perforation 202A. FIG. 19 depicts the result obtained when mask tape 213 is positioned over perforated pavement tape 200. It is to be understood and appreciated that mask tape 213 may function as upper substrate layer 206, and perforated pavement tape 201 may serve as a base substrate layer 103 (as in FIG. 16). Alternately, mask tape 213 may be a separate tape utilized with a perforated pavement tape 201 which includes upper and base substrate layers 206, 103, along with their respective faces and adhesive layers.

The only part of tape body 201 that is visible through mask perforation 211 is the portion of tape body 201 surrounding and bearing the circular symbol perforation 202A. If mask tape body 212 is black, and if tape body 201 is embedded on its top surface with reflective glass beads backed with black pavement, the visual result at night to a motorist using headlights or a pedestrian with a flashlight will be a shining star with a black center. Alternately, as described herein above, glass beads 109 may be disposed on the surface of pavement 112, beneath a base substrate layer 103 (not shown) of perforated pavement tape 200. Circular symbol perforation 202A may extend through tape body 201 and base substrate 103, or through tape body 201 where base substrate 103 is made of a light-transmissive material, to convey the effect of a shining center.

Composite images of this type may take many forms. They may be built from two layers of tape or from many layers. The component tapes may be a spectrum of colors and textures, including transparent components. Transparent components may provide actual visual depth and provide a viewer with a three-dimensional image. Holographic or other components may simulate visual depth and provide a viewer with an illusion of a three-dimensional image. Upper perforations need not surround lower perforations in their entirety, but rather surround only portions of lower perforations. Designer choices govern these selections.

Figure 20:
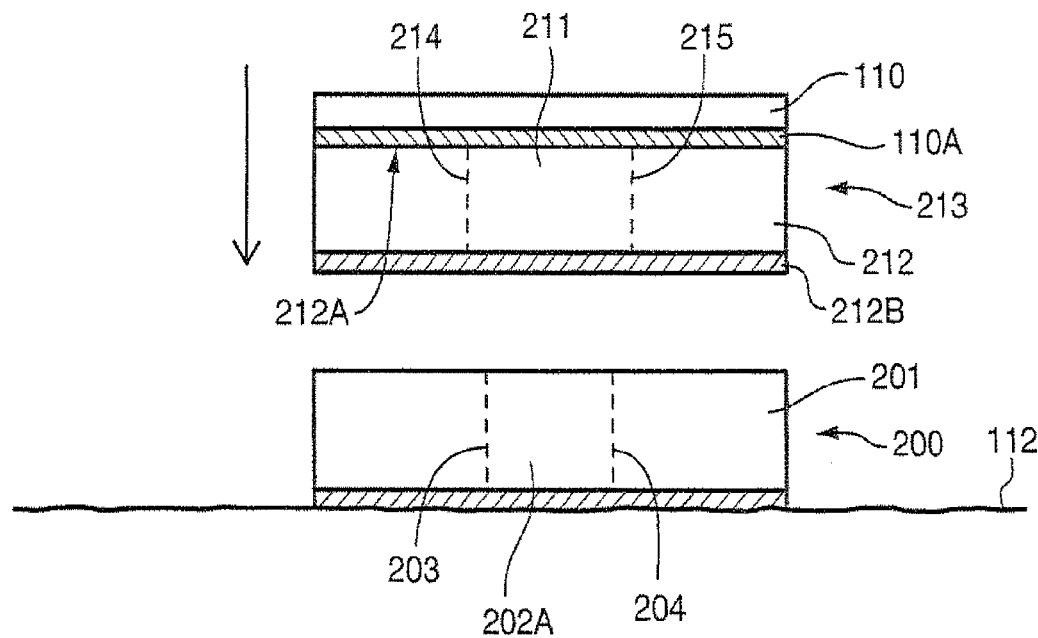
FIG. 20 depicts the bonding of a composite form of the mask tape of FIG. 17 to a pre-applied perforated pavement tape of FIG. 18.

FIG. 20 depicts a side view of the creation of a two-color composite perforated pavement tape using the mask tape 213 of FIG. 17 and the perforated pavement tape 200 of FIG. 18. Here, tape body 201 is colored red and is bonded to pavement 112, which is black. Circular symbol perforation 202 has boundaries 203 and 204.

Mask tape 213 has a green mask tape body 212. The top surface 212A of the body is bonded to a protective tape 110 by a protective tape adhesive 110A. Its bottom surface 212B is coated with an adhesive of the same type used to bond perforated pavement tape 200 to pavement 112 (e.g., as used in first adhesive layer 104A) although this is not a requirement. Mask tape 213 is perforated by mask perforation 211 with boundaries 214 and 215, which exceed boundaries 203 and 204 of perforated pavement tape 200 at all points, as depicted in FIG. 19.

When mask tape 213 is bonded to perforated pavement tape 200 so that mask perforation 211 is aligned directly above symbol perforation 202, as illustrated in FIG. 19, a viewer will observe the green surface of mask tape body 212 interrupted by the star-shaped mask perforation 211. Behind mask perforation 211, the viewer will observe the smaller, circular symbol perforation 202 of perforated pavement tape 200. That symbol will be as black as the pavement beneath it and surrounded by the red of tape body 201 up to the boundaries imposed by mask perforation 211 of mask tape body 212. The visual result will be a red star with a black center in a green backdrop.

It is to be understood and appreciated that alternate configurations of perforated pavement tape 200 and mask tape 213 may also be implemented. For example, base substrate layer 103 (e.g., FIG. 6) may be a perforated pavement tape and upper substrate layer 106 may be a mask tape.

Figure 21:
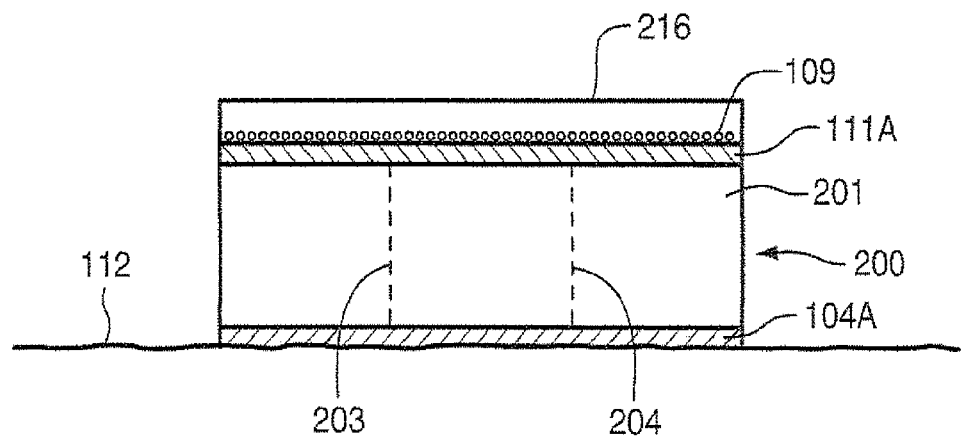
FIG. 21 depicts a composite form of the perforated pavement tape of FIG. 16 with a protective coating.

FIG. 21 depicts the composite tape of FIG. 16, with a layer of reflective glass beads 109 and without protective tape and protective tape adhesive 110, 110A. In the embodiment of FIG. 21, the layer of reflective glass beads 109 is covered with a protective coating 216. A protective coating is often useful for protecting the perforated pavement tapes and composite structures discussed above, whether or not they are covered with reflective glass beads.

Figure 22:
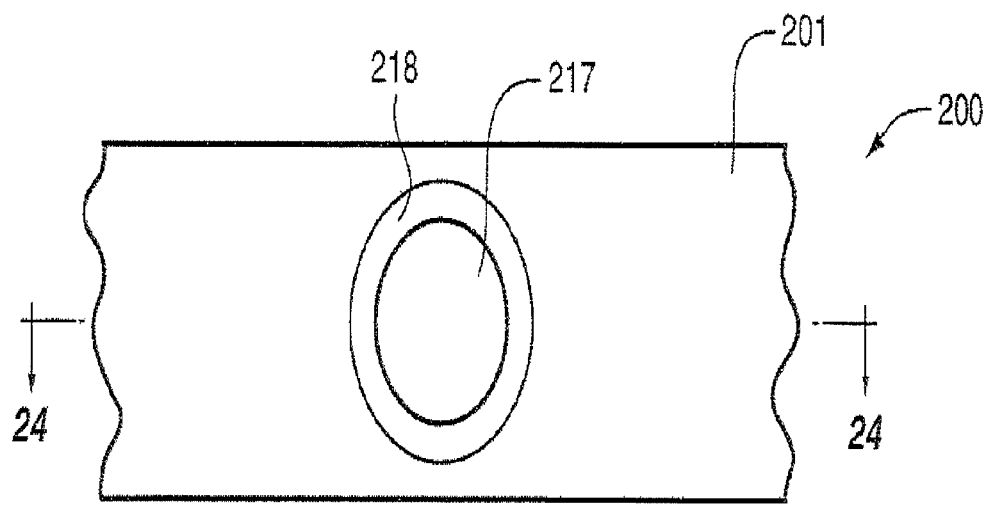
FIG. 22 depicts a top view of the perforated pavement tape of FIG. 18 with a chamfered edge.
Figure 23:
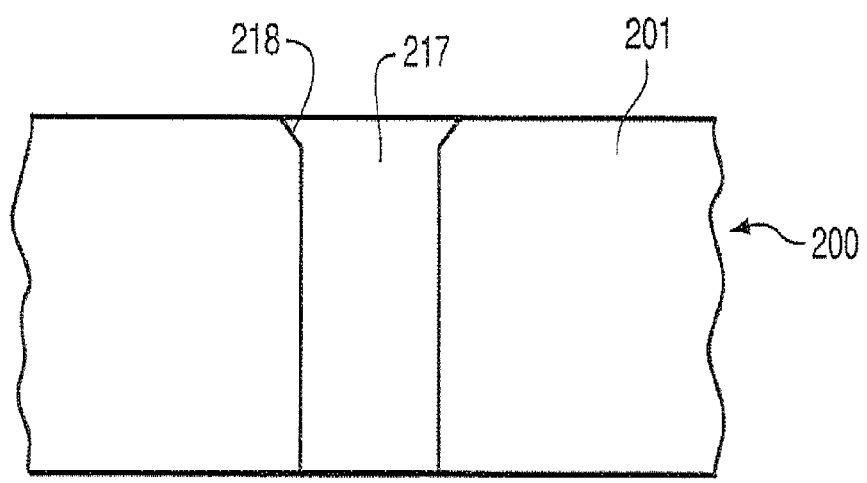
FIG. 23 depicts a sectional side view of the perforated pavement tape of FIG. 22.

FIG. 22 depicts a perforated pavement tape 200 comprising a tape body 201 and a symbol perforation 217. The symbol perforation 217 is circular and its upper edge 218 has been chamfered. FIG. 23 depicts a side-view section of the perforated pavement tape of FIG. 22. Chamfering may in some circumstances serve to preserve the life of perforated pavement tape 200 by avoiding sudden or catastrophic failure of symbol perforation edges. This is a design choice, however, not a requirement.

Figure 24:
FIG. 24 depicts a pavement tape comprising a tape body and a text message.
Figure 25:
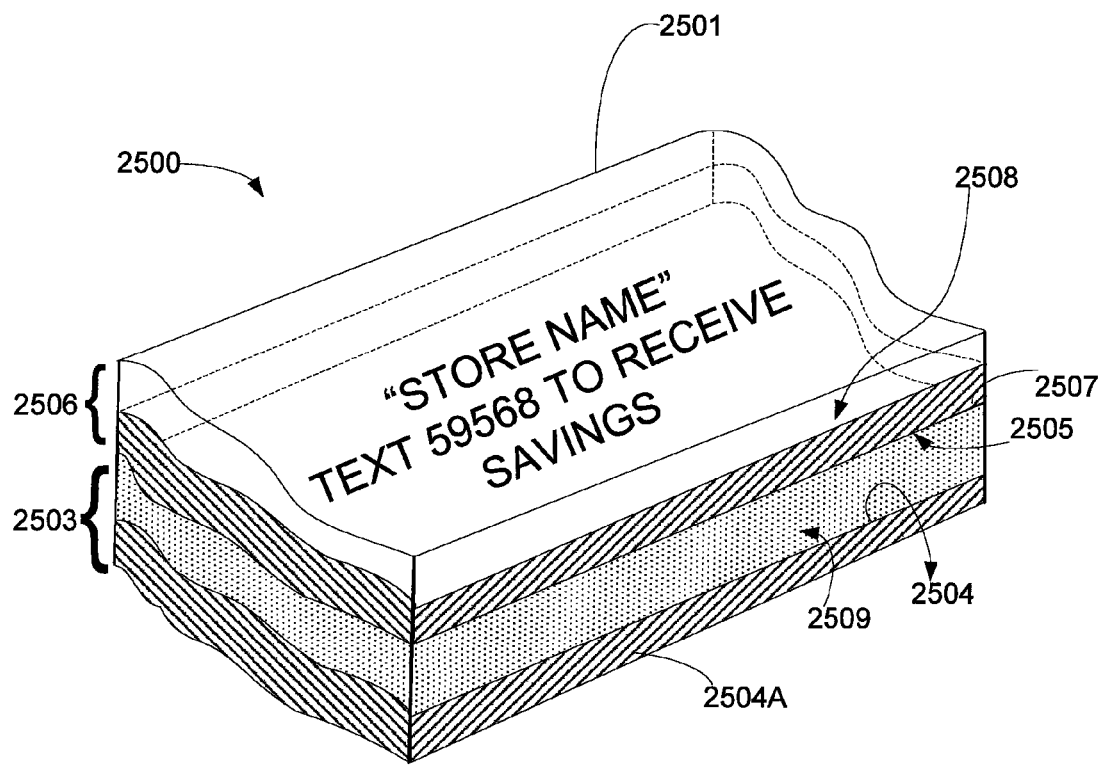
FIG. 25 depicts a perspective view of pavement tape with tape body.

FIG. 24 depicts a pavement tape 2500 that includes a tape body 2501 and a text message 2502. FIG. 25 depicts a perspective view of pavement tape 2500 with tape body 2501. Pavement tape 2500 includes tape body 2501 with a base substrate layer 2503 having a rear face 2504 and a front face 2505. As disclosed above, base substrate layer 2503 may be formed with a film such as a PVC film. Under extreme weather (e.g., too hot or too cold), however, the film can crack. To improve durability and flexibility, the film is treated with a cold crack additive 2509. Cold crack additive 2509 is illustratively shown in FIG. 25 as dots, for purposes of illustration. Cold crack additive 2509 includes an impact resistance agent and a weather resistance agent. Such agents may be polyvinyl chloride resin, di-isonyl phthalate, dioctyl adipate, a stability agent, and/or variations thereof.

Text message 2502 may be printed upon front face 2505 of base substrate layer 2503. Text message 2502 may be digitally printed upon front face 2505. For outdoor applications, a long-lasting outdoor ink may be used for printing text message 2502 upon front face 2505. Text message 2502 prompts the consumers to interact directly with the advertiser such as to retrieve a message or a discount, for example.

First adhesive layer 2504A, applied to the rear face 2504, may be a pressure sensitive adhesive. The pressure sensitive adhesive may be a weather- and solvent-resistant acrylic adhesive having similar specifications to those described above. In one embodiment, first adhesive layer 2504A may be a rubber adhesive that serves as both tape body 2501 and adhesive layer 2504A at the same time.

An upper substrate layer 2506, including a second adhesive layer 2507, protects front face 2505 of base substrate layer 2503. Upper substrate layer 2506 is, for example, a pressure sensitive, weather-resistant acrylic adhesive covered with an 18 mm, 235 g/m² vinyl PVC film. The acrylic adhesive layer 2507 may thus have similar specifications as to those adhesive layers described above. A smooth, transparent PVC film having a matte finish may provide be added to for easy viewing of text message 2502, while reducing glare from sunlight, streetlights, or headlights, for example. Protective layer 2508, partially covering the upper substrate layer 2506, may be a suitable protective material, such as a siliconized paper layer, and adhesive layer 2507 may be a suitably strong, weather resistant adhesive.

Upper substrate layer 2506 joins with base substrate layer 2503 at front face 2505. For example, upper substrate layer 2506 may be joined with base substrate layer 2503 by placing upper substrate layer 2506 atop base substrate layer 2503 such that second adhesive layer 2507 contacts and adheres to front face 2505. The joined substrate layers 2503, 2506 may also be fixed together, for example, by laminating (e.g., cold laminating) upper substrate layer 2506 to base substrate layer 2503.

The various tape and pavement configurations described in the detailed description set forth are not intended to limit the scope of this application. Changes may be made in the information bearing pavement tape described herein without departing from the scope thereof. The matter contained in the above description or shown in the accompanying drawings should be interpreted as illustrative, and not in a limiting sense. The following claims are intended to cover all generic and specific features described herein, as well as all statements of the scope of the present system and methods, which, as a matter of language, might be said to fall therebetween.

I claim:

1. A method of conveying information from a section of pavement, comprising:
    applying at least one message conveying the information to a front face of a base substrate layer comprising a cold crack agent, wherein a rear face of the base substrate layer is bonded to a front face of a pressure-sensitive adhesive layer, and wherein a releasable liner is bonded to a rear face of the pressure-sensitive adhesive layer;
    affixing an upper substrate layer to at least a portion of the front face of the base substrate layer, wherein the upper substrate layer comprises a protective tape on a front face of the upper substrate layer;
    removing the liner to expose the rear face of the pressure-sensitive adhesive layer;
    bonding the rear face of the pressure-sensitive adhesive layer to a surface of the section of pavement; and
    removing the protective tape after bonding the rear face of the pressure-sensitive adhesive layer to the surface of the section of pavement,
    wherein the cold crack agent comprises polyvinyl chloride resin,
    wherein a thickness of the base substrate layer has a range of about 0.003 inches to 0.004 inches;
    wherein a thickness of the pressure-sensitive adhesive layer has a range of about 0.002 inches to 0.005 inches; and
    wherein the upper substrate layer is a clear film having a thickness of about 0.001 inches to 0.007 inches.

2. The method of claim 1, wherein the surface of the section of pavement is a portion of a parking lot comprising asphalt.

3. The method of claim 1, wherein the step of applying the at least one message comprises digitally printing at least a portion of the at least one message on the front face of the base substrate layer.

4. The method of claim 1, wherein the upper substrate layer is a clear polyvinyl chloride film, and
    wherein the step of affixing the upper substrate layer to at least the portion of the front face of the base substrate layer comprises adhering the clear polyvinyl chloride film to the front face of the base substrate layer.

5. The method of claim 1, wherein the step of affixing the upper substrate to at least the portion of the front face of the base substrate layer comprises laminating the upper substrate layer to the front face of the base substrate layer.

6. The method of claim 1, wherein the step of bonding the rear face of the pressure-sensitive adhesive layer to the surface of the section of pavement comprises:
    applying pressure to the front face of the upper substrate layer.

7. The method of claim 1, wherein the surface of the section of pavement comprises a pavement adhesive tape affixed thereto, and
    wherein the step of bonding the rear face of the pressure-sensitive adhesive layer to the surface of the section of pavement comprises bonding the rear face of the pressure-sensitive adhesive layer to the pavement adhesive tape.

8. The method of claim 1, wherein the message comprises at least one symbol perforation extending through the upper substrate layer, the base substrate layer and the pressure-sensitive adhesive layer.

9. The method of claim 1, wherein the upper substrate layer is a mask layer having at least one mask perforation,
    wherein the base substrate layer comprises at least one perforation, and
    wherein the step of affixing the upper substrate layer to at least the portion of the front face of the base substrate layer comprises positioning a portion of the at least one mask perforation over a portion of the at least one perforation of the base substrate layer, and
    wherein the portion of the at least one mask perforation and the portion of the at least one perforation of the base substrate layer form a symbol perforation extending through the upper substrate layer, the base substrate layer and the pressure-sensitive adhesive layer.

10. A method of conveying information from a section of pavement, comprising:
    applying at least one message conveying the information to a front face of a base substrate layer comprising a cold crack agent, wherein a rear face of the base substrate layer is bonded to a front face of a pressure-sensitive adhesive layer, and wherein a releasable liner is bonded to a rear face of the pressure-sensitive adhesive layer;

affixing an upper substrate layer to at least a portion of the front face of the base substrate layer, wherein the upper substrate layer comprises a protective tape on a front face of the upper substrate layer;

removing the liner to expose the rear face of the pressure-sensitive adhesive layer;

attaching a railing to an edge of the base substrate layer and an edge of the upper substrate layer;

bonding the rear face of the pressure-sensitive adhesive layer to a surface of the section of pavement; and removing the protective tape after bonding the rear face of the pressure-sensitive adhesive layer to the surface of the section of pavement, wherein the railing is attached to the edge of the base substrate layer and the edge of the upper substrate layer prior to bonding the rear face of the pressure-sensitive adhesive layer to the surface of the section of pavement;

wherein the cold crack agent comprises polyvinyl chloride resin;

wherein a thickness of the base substrate layer has a range of about 0.003 inches to 0.004 inches;

wherein a thickness of the pressure-sensitive adhesive layer has a range of about 0.002 inches to 0.005 inches; and wherein the upper substrate layer is a clear film having a thickness of about 0.001 inches to 0.007 inches.

11. A method of conveying information comprising:

forming a symbol in a base substrate layer, wherein the base substrate layer is a film comprising polyvinyl chloride and having a thickness of about 3 to 4 mils, and wherein a rear face of the base substrate layer includes a coating of a pressure-sensitive adhesive comprising rubber and acrylic and having a thickness of about 2 to 5 mils;

laminating an upper substrate layer to a front face of the base substrate layer to form a pavement tape, wherein the upper substrate layer comprises a protective tape on a front face of the upper substrate layer, and wherein the upper substrate layer is a clear polyvinyl chloride film covering at least a portion of the symbol and having a thickness of about 1 to 7 mils;

adhering the pavement tape to a section of pavement; and removing the protective tape after adhering the pavement tape to the section of pavement.

12. The method of claim 11, wherein the pavement tape comprises at least one symbol perforation extending therethrough.

* * * * *